United States Patent
Miyamoto

(10) Patent No.: US 9,109,069 B2
(45) Date of Patent: Aug. 18, 2015

(54) VINYL ESTER RESIN COMPOSITION THAT CONTAINS MINUTE POLYMER PARTICLES, PROCESS FOR PRODUCTION OF SAME, AND CURED PRODUCTS OF SAME

(75) Inventor: Masahiro Miyamoto, Settsu (JP)

(73) Assignee: KANEKA CORPORATION, Osaka (JP)

( * ) Notice: Subject to any disclaimer, the term of this patent is extended or adjusted under 35 U.S.C. 154(b) by 127 days.

(21) Appl. No.: 13/377,214

(22) PCT Filed: May 27, 2010

(86) PCT No.: PCT/JP2010/003547
§ 371 (c)(1),
(2), (4) Date: Feb. 22, 2012

(87) PCT Pub. No.: WO2010/143366
PCT Pub. Date: Dec. 16, 2010

(65) Prior Publication Data
US 2012/0142863 A1    Jun. 7, 2012

(30) Foreign Application Priority Data

Jun. 9, 2009  (JP) .................................. 2009-138458
Mar. 10, 2010  (JP) .................................. 2010-053515

(51) Int. Cl.
*C08L 51/04* (2006.01)
*C08L 63/10* (2006.01)
*C08F 290/00* (2006.01)
*C08L 31/00* (2006.01)

(52) U.S. Cl.
CPC ............. *C08F 290/00* (2013.01); *C08L 31/00* (2013.01); *C08L 51/04* (2013.01); *C08L 63/10* (2013.01)

(58) Field of Classification Search
None
See application file for complete search history.

(56) References Cited

U.S. PATENT DOCUMENTS 5,453,458 A  *  9/1995  Takeuchi et al. .............. 523/201

FOREIGN PATENT DOCUMENTS

| JP | 11-263818 | A | * | 9/1999 |
| JP | 2000-017235 | A |  | 1/2000 |
| JP | 2000-17235 | A | * | 1/2000 |
| JP | 2001-64062 | A |  | 3/2001 |
| JP | 2001-098175 | A |  | 4/2001 |
| JP | 2001-98175 | A | * | 4/2001 |
| JP | 2003-327845 | A | * | 11/2003 |
| JP | 2006-257289 | A |  | 9/2006 |

OTHER PUBLICATIONS

International Preliminary Report on Patentability of PCT/JP2010/003547, with Forms PCT/IB/373 and PCT/ISA/23, Jan. 17, 2012.

* cited by examiner

*Primary Examiner* — Robert Sellers
(74) *Attorney, Agent, or Firm* — Westerman, Hattori, Daniels & Adrian, LLP

(57) ABSTRACT

The present invention provides a vinyl ester resin composition obtained by an improved production method and having improved quality, by providing a minute polymer particle-containing vinyl ester resin composition containing 100 parts by weight of a vinyl ester resin, 1 to 100 parts by weight of a minute polymer particle, and 0 to 100 parts by weight of a vinyl monomer, wherein the primary particle size of the minute polymer particle is 0.05 μm to 1 μm, and the minute polymer particles are dispersed in the form of primary particles in the minute polymer particle-containing vinyl ester resin composition.

6 Claims, No Drawings

VINYL ESTER RESIN COMPOSITION THAT CONTAINS MINUTE POLYMER PARTICLES, PROCESS FOR PRODUCTION OF SAME, AND CURED PRODUCTS OF SAME

TECHNICAL FIELD

The present invention relates to a vinyl ester resin composition that contains a minute polymer particle, a method for producing the same, and a cured product of the same.

BACKGROUND ART

Addition reaction products, obtained by an addition reaction of an unsaturated monobasic acid such as (meth) acrylic acid with an epoxy group present inside a molecule of a polyepoxide such as bisphenol A-based epoxy resin in the presence of a catalyst, and resins obtained by mixing a vinyl monomer therewith, are generally referred to as vinyl ester resins, and all of these are curable resin compositions. These are also referred to as epoxy (meth)acrylate resins.

There have been numerous attempts to modify vinyl esters by adding various polymers to vinyl ester resins conceptually including these epoxy (meth)acrylate resins, and in particular some attempts to improve toughness by adding a powder of minute polymer particles having a core-shell structure are disclosed in Patent Document 1 and Patent Document 2.

In Patent Document 1, for example, a resin composition solution is prepared by mixing and stirring, while heating at 60° C., a resin composition obtained by dispersing minute polymer particles having a core-shell structure, "Kureha Paraloid" EXL-2655, composed of a core portion comprising a copolymer of styrene and butadiene and a shell portion comprising a methacrylic acid-alkyl copolymer, in a liquid mixed resin composition of styrene and a vinyl ester derived from bisphenol A diglycidyl ether with a homomixer manufactured by Tokushu Kika Kogyo Co., Ltd.

In addition, in Patent Document 2, for example, a BMC for synthetic marble is prepared by mixing and stirring 100 parts of a vinyl ester resin, 15 parts of a rubber-containing minute polymer particle having a core-shell structure (average particle size: 0.3 µm, rubber glass transition temperature: −50° C., Zeon Kasei Co., Ltd., product name: F-351), 2 parts of a curing agent (NOF Corp., product name: Percure HOT), 200 parts of aluminum hydroxide (Sumitomo Chemical Co., Ltd., product name: CW-308B), 1 part of magnesium oxide (Kyowa Chemical Industry Co., Ltd., product name: Kyowa Mag #150), 5 parts of zinc stearate (Adeka Fine Chemical Co., Ltd., product name: ZNS-P) and 5 parts of crosslinked polystyrene (Soken Chemical and Engineering Co., Ltd., product name: SGP-70C) with a planetary mixer, followed by aging for 24 hours at room temperature.

In other words, in these prior art, vinyl ester resins containing minute polymer particles having a core-shell structure are obtained by mixing a common commercially available powder of minute polymer particles having a core-shell structure into a vinyl ester.

A powder of minute polymer particles having a core-shell structure is produced by carrying out coagulation/drying treatment on core-shell-type polymer particles in the form of an aqueous latex prepared by emulsion polymerization. Although each of the core-shell polymer particles has been produced typically having a primary particle size of 0.1 µm to 1 µm, when converted to a powder by going through coagulation/drying treatment, a plurality of particles agglomerate to form a powder in the form of agglomerates having a secondary particle size of about 100 µm to 200 µm. Since particles having a size of 0.1 µm to 1 µm have an extremely high physical cohesive force, it is difficult to form a powder in which the particles are separated from one another.

Moreover, it has been necessary to set the glass transition temperature of the shell polymer of minute polymer particles having a core-shell structure to a temperature significantly higher than room temperature. The glass transition temperature of typical shell polymers has been set to 70° C. or higher. Unless this is done, it is well known that the above-mentioned secondary particle size increases considerably, not only causing the powder to become coarse and extend over a wide size range due to, for example, the simultaneous presence of particles of a few centimeters to a few millimeters, but also impairing handleability (e.g. powder blocking). Moreover, as the secondary particle size increases, considerable labor and energy are required to disperse particles to approach a dispersion of primary particles.

Thus, even if a powder of minute polymer particles having a core-shell structure is mixed into a liquid such as a vinyl ester resin and subjected to powerful mechanical shearing force with a homogenizer or the like, it is extremely difficult for the minute polymer particles having a core-shell structure to achieve a uniform dispersion in which particles are separated from one another without agglomeration in the vinyl ester.

In addition, vinyl esters generally contain a large amount of styrene monomers, and from the viewpoints of, for example, odor, safety and preventing the quality deterioration due to unwanted polymerization, mixing with a powder of minute polymer particles having a core-shell structure cannot be industrially convenient. Thus, the technology of modifying vinyl esters with minute polymer particles having a core-shell structure has actually been used in a small number of extremely particular applications.

Patent Document 1: JP-A 2001-098175
Patent Document 2: JP-A 2003-327845

SUMMARY OF THE INVENTION

An object of the present invention is to provide an improved method for producing a vinyl ester resin containing minute particles, and an improved vinyl ester resin composition obtainable by this production method. More specifically, an object of the present invention is to provide a vinyl ester resin modified with a core-shell-type polymer while avoiding all of the numerous bothersome problems that have been unable to be avoided in the prior art in the case of modifying vinyl ester resins with core-shell-type minute particles.

In the present invention, it is found that by employing a specific vinyl ester resin composition and minute polymer particle structure, the composition has a handleable viscosity range and is capable of maintaining stability so that a state of primary dispersion can be maintained without causing agglomeration of the minute polymer particles even if any changes occur in polarity and viscosity.

Specifically, the present invention relates to a minute polymer particle-containing vinyl ester resin composition, comprising 100 parts by weight of a vinyl ester resin, 1 to 100 parts by weight of a minute polymer particle, and 0 to 100 parts by weight of a vinyl monomer, wherein the primary particle size of the minute polymer particle is 0.05 µm to 1 µm, and the minute polymer particles are dispersed in the form of primary particles in the minute polymer particle-containing vinyl ester resin composition.

In a preferred embodiment of the minute polymer particle-containing vinyl ester resin composition, the vinyl ester resin is a reaction product of an ethylenically unsaturated double bond-containing monocarboxylic acid and a minute polymer particle-containing polyepoxide which contains 100 parts by weight of a polyepoxide and 1 to 100 parts by weight of the minute polymer particle and in which the minute polymer particles are dispersed in the form of primary particles in the polyepoxide.

In a preferred embodiment of the minute polymer particle-containing vinyl ester resin composition, a (meth)acrylate group is grafted to the minute polymer particle. Here, "a (meth)acrylate group is grafted" means the presence of a (meth)acrylate group on the chain of the polymer in the form of a minute polymer particle, but does not mean the presence of a polymer in which (meth)acrylate groups are polymerized. Namely, this means that a (meth)acrylate group that may serve as the starting point of polymerization is grafted to the minute polymer particle, but does not mean that polymerized (meth)acrylate residues are contained. Of course, if the above-mentioned grafted (meth)acrylate group is contained, those which contain the polymerized (meth)acrylate residues are also included in the minute polymer particles.

In providing more detailed explanation of this, "a (meth) acrylate group is grafted" means that a (meth)acrylate group is grafted to (pending from) the polymer chain of the minute polymer particle via an ester bond, but does not mean that it is grafted to the polymer chain of the minute polymer particle by a reaction of the unsaturated double bond of a (meth)acrylate group. Namely, this means that a (meth)acrylate group is grafted to the minute polymer particle by ester bond formation, but does not mean that it is integrated in the polymer chain via a carbon-carbon bond. Accordingly, such a (meth) acrylate group serves as a radical-polymerizable reaction site possessed by the minute polymer particle.

In a preferred embodiment of the minute polymer particle-containing vinyl ester resin composition, the reaction product is a reaction product of an ethylenically unsaturated double bond-containing monocarboxylic acid and the minute polymer particle-containing polyepoxide in which the epoxy equivalent weight has been increased by 25 g/eq or more from less than 500 g/eq in the presence of the minute polymer particles dispersed in the form of primary particles.

In a preferred embodiment of the minute polymer particle-containing vinyl ester resin composition, the minute polymer particle has a core-shell structure, and a shell polymer thereof is a copolymer of 100% by weight of shell forming monomers (A) composed of 30% to 95% by weight of an aromatic vinyl monomer, 5% to 70% by weight of a vinyl cyan monomer, 0% to 55% by weight of an epoxy group-containing (meth)acrylate monomer, 0% to 30% by weight of a polyfunctional vinyl monomer and 0% to 50% by weight of other vinyl monomers.

Another object of the present invention is to provide the above-described vinyl ester resin composition of the present invention, particularly having greatly improved toughness of a cured product thereof. More specifically, another object of the present invention is to provide a vinyl ester resin that is modified with a type of core-shell-type polymer that has presented technical problems and not been heretofore attempted.

Namely, the present invention also relates to a vinyl ester resin composition containing a core-shell-type minute polymer particle of which a shell polymer has a glass transition temperature below 20° C., and preferably below 0° C., or in other words, is a soft polymer, and which has presented difficulties in handling in the prior art, and to a production method thereof.

In other words, it is found by the inventors of the present invention that the toughness of a cured product of the composition is greatly improved by adding to a vinyl ester resin a minute polymer particle having a shell polymer layer that is made of a soft polymer, which has heretofore not been attempted, and can realize dispersion as primary particles.

Namely, the inventors of the present invention has also found a method for producing a vinyl ester resin composition containing such a minute polymer particle with the shell polymer layer made of a soft polymer, the composition having a handleable viscosity range and being capable of maintaining stability so that a state of primary dispersion can be maintained without causing agglomeration of the minute polymer particles even if any changes occur in polarity and viscosity.

Namely, another preferred embodiment of the present invention is a minute polymer particle-containing vinyl ester resin composition in which the minute polymer particle has a core-shell structure, and a shell polymer thereof has a glass transition temperature (Tg) of below 20° C.

A preferred embodiment in this case is a minute polymer particle-containing vinyl ester resin composition in which the glass transition temperature (Tg) of the shell polymer is below 0° C.

Another preferred embodiment in this case is a minute polymer particle-containing vinyl ester resin composition in which the shell polymer is a copolymer of shell forming monomers (B) and 100% by weight of the shell forming monomers are composed of 5% to 95% by weight of an alkoxyalkyl (meth)acrylate, 0% to 40% by weight of glycidyl (meth)acrylate, 0% to 20% by weight of a polyfunctional vinyl monomer, and 5% to 70% by weight of other vinyl monomers.

In addition, the present invention relates to a cured product obtained by curing by radical polymerization a curable composition comprising the above-described minute polymer particle-containing vinyl ester resin composition of the present invention, wherein the minute polymer particles are dispersed in the form of primary particles.

Moreover, the present invention relates to a method for producing the above-mentioned minute polymer particle-containing vinyl ester resin composition of the present invention, comprising in the following order:

a step of obtaining the minute polymer particle-containing polyepoxide, a step of obtaining a minute polymer particle-containing vinyl ester resin by reacting an ethylenically unsaturated double bond-containing monocarboxylic acid with the minute polymer particle-containing polyepoxide, and a step of adding the vinyl monomer to the vinyl ester resin.

A vinyl ester resin composition can be provided that is able to achieve improved particle dispersion stability as compared with that of the prior art while simultaneously having superior mechanical properties.

BEST MODE FOR CARRYING OUT THE INVENTION

Minute polymer Particle-Containing Vinyl Ester Resin Composition

Since the minute polymer particle-containing vinyl ester resin composition of the present invention contains 100 parts by weight of a vinyl ester resin, 1 to 100 parts by weight of a minute polymer particle, and 0 to 100 parts by weight of a vinyl monomer, wherein the primary particle size of the minute polymer particle is 0.05 μm to 1 μm, and the minute polymer particles are dispersed in the form of primary particles in the minute polymer particle-containing vinyl ester resin composition, a cured product thereof has superior mechanical properties.

In particular, in the case of a minute polymer particle-containing vinyl ester resin composition in which the minute polymer particle has a core-shell structure and a shell polymer thereof has a glass transition temperature (Tg) of below 20° C. and preferably below 0° C., or in other words, the shell polymer is a soft polymer, a cured product thereof has particularly superior mechanical properties. In this case, the minute polymer particles are particularly preferably dispersed in the form of primary particles in the minute polymer particle-containing vinyl ester resin composition from the viewpoint of further improving the mechanical properties.

Although the curable composition of the present invention is required to contain 1 to 100 parts by weight of the minute polymer particle relative to 100 parts by weight of the vinyl ester resin as previously described, it preferably contains 1 to 45 parts by weight of the minute polymer particle from the viewpoint of obtaining a favorable balance between handleability and the effect of improving toughness. More preferably, the composition of the present invention is prepared in such a manner that the content of the minute polymer particle is 11 to 80 parts by weight, and is used as a suitable dilution with the vinyl monomer used in the present invention, as necessary. Alternatively, a form of use in which the composition of the present invention is adjusted to a target minute polymer particle concentration by mixing with a commercially available vinyl ester resin is preferable industrially.

The content of the vinyl monomer contained in the composition of the present invention is 0 to 100 parts by weight. As the vinyl monomer content increases, the viscosity of the composition of the present invention decreases so that handling becomes easier. The content of the vinyl monomer may be appropriately determined so as to obtain a desirable balance among physical properties of the cured product.

The primary particle size of the minute polymer particle in the present invention is within the range of a volume average particle size of 0.05 μm to 1 μm. Moreover, in the composition of the present invention, the minute polymer particles are dispersed as primary particles, or in other words, are dispersed at a particle size of 0.05 μm to 1 μm, in a continuous phase substantially made of 100 parts by weight of the vinyl ester resin and 0 to 100 parts by weight of the vinyl monomer. In addition, since it is preferable that the minute polymer particle may swell but does not dissolve in the other components used in the present invention, namely the vinyl ester resin and the vinyl monomer component, the later-described core polymer layer of the minute polymer particle in the present invention, for example, is preferably a polymer having a crosslinked structure. As a result of containing such a polymer having a crosslinked structure, the minute polymer particle in the present invention may swell but does not dissolve, or in other words, does not lose its minute particle form, in solvents such as toluene, acetone, MEK, ethyl acetate, THF and methylene chloride which are considered to be good solvents thereof.

(Dispersion in the Form of Primary Particles)

Dispersion of the minute polymer particles in the form of primary particles (to also be referred to as primary dispersion) in the minute polymer particle-containing vinyl ester resin composition or polyepoxide (to also be referred to as a continuous phase) in the present invention means that the minute polymer particles having a primary particle size of 0.05 μm to 1 μm in the present invention are substantially independently dispersed (out of contact with one another), and the dispersion can be analyzed by, for example, dissolving a portion of the minute polymer particle-containing polyepoxide in a solvent such as methyl ethyl ketone and measuring the particle size thereof with a particle size measuring device using laser light scattering or the like.

The "stable dispersion" of minute polymer particles means that the minute polymer particles are steadily dispersed over a long period of time under normal conditions without undergoing agglomeration, separation or sedimentation in a continuous phase. In addition, it is preferable that the distribution of the minute polymer particles in the continuous phase also remains substantially unchanged, and that the "stable dispersion" can be maintained even if the composition is heated to a temperature without danger to reduce the viscosity and is stirred.

(Production Method of Minute Polymer Particle-Containing Vinyl Ester Resin Composition)

The minute polymer particle-containing vinyl ester resin composition of the present invention is obtained by a step in which an ethylenically unsaturated double bond-containing monocarboxylic acid is reacted with a minute polymer particle-containing polyepoxide which is obtained by a later-described step of obtaining a minute polymer particle-containing polyepoxide and in which minute polymer particles having a primary particle size of 0.05 μm to 1 μm are dispersed in the form of primary particles.

In a preferred embodiment of the present invention, the composition can be obtained by going through a step of adding a vinyl monomer in which 0 to 100 parts by weight of the vinyl monomer is mixed with 100 parts by weight of that minute polymer particle-containing vinyl ester resin.

In addition, in another preferred embodiment of the present invention, a vinyl monomer can be present during the step of reacting the polyepoxide and the ethylenically unsaturated double bond-containing monocarboxylic acid.

It is noted that the term "(meth)acrylate" used herein refers to acrylate and/or methacrylate.

The (meth)acryloyloxy group addition reaction for obtaining the minute polymer particle-containing vinyl ester resin by reacting an ethylenically unsaturated double bond-containing monocarboxylic acid with the minute polymer particle-containing polyepoxide is preferably carried out within 8 hours at a reaction temperature of 60° C. to 150° C., and from the viewpoint of avoiding gelling during the reaction, is more preferably completed within 5 hours at a reaction temperature of 70° C. to 135° C. Although the endpoint of the reaction can usually be determined by monitoring the acid value of the reaction product, there are no particular limitations on the acid value of the minute polymer particle-containing polyepoxide in the present invention or the minute polymer particle-containing vinyl ester resin composition of the present invention following completion of the reaction, the acid value may be appropriately determined according to the application, and it presents no particular problems if it is an acid value within a range equivalent to those of commonly used vinyl esters. Although the acid value is preferably 20 mgKOH/g or less, it may also be less than 10 mgKOH/g in the case it is necessary to reduce the amount of residual acidic components from the viewpoints of corrosion resistance, hot water resistance, and the like, or conversely may be an acid value within a range equivalent to those of commonly used vinyl esters of 20 mgKOH/g or more in order to intentionally increase the amount of residual acidic components from the viewpoints of adhesiveness and the like. Moreover, this reaction can be carried out either in an inert gas atmosphere such as nitrogen gas or carbon dioxide gas, or in the presence of oxygen, for example, in an air atmosphere or mixed nitrogen-oxygen gas atmosphere in which the oxygen content has been set to be lower than that of air, provided that problems such as gelling do not occur during the course of the reaction. As the polyepoxide used as a raw material of the composition of the present invention has a smaller epoxy value, it tends to be more preferable that the reaction is carried out in the presence of oxygen.

((Meth)acryloyloxy Group Addition Reaction)

The amount of epoxy groups in the polyepoxide of the minute polymer particle-containing polyepoxide and the amount of carboxylic acid groups of the above-mentioned ethylenically unsaturated double bond-containing monocarboxylic acid used in the above-mentioned (meth)acryloyloxy addition reaction are indicated by molar ratio as follows. Centering on the vicinity of a point in which the amount of carboxylic acid groups is equal to the amount of epoxy groups contained only in the polyepoxide, the upper limit of the amount of carboxylic acid groups is preferably in a small excess, or in other words, such that the amount of carboxylic acid groups is 1.1 molar equivalents to 1 molar equivalent of the total amount of epoxy groups of both the polyepoxide and the minute polymer particles, since this enables (meth)acryloyloxy groups to be sufficiently imparted to the minute polymer particles. On the other hand, the lower limit of the amount of carboxylic acid groups is preferably 0.5 molar equivalents to 1 molar equivalent of epoxy groups contained in the polyepoxide.

The above-mentioned (meth) acryloyloxy addition reaction is preferably carried out in the presence of a catalyst. Examples of such catalysts that can be used include tertiary amines such as dimethylbenzylamine and tributylamine, quaternary ammonium salts such as trimethylbenzylammonium chloride, as well as salts of primary and secondary amines, inorganic salts such as lithium chloride, N-substituted aromatic amines such as N,N-dimethylaniline, imidazole compounds such as 2-ethyl-4-methylimidazole, tri-substituted phosphines such as triphenylphosphine, and quaternary phosphonium salts such as tetrabutyl phosphonium salts. From the viewpoints of reactivity and cost, the amount of such a catalyst is preferably within the range of 0.01 to 1 part by weight relative to 100 parts by weight of the total amount of the polyepoxide of the minute polymer particle-containing polyepoxide and the ethylenically unsaturated double bond-containing monocarboxylic acid.

The above-mentioned (meth)acryloyloxy group addition reaction is preferably carried out in the presence of a polymerization inhibitor. Examples of such polymerization inhibitors include hydroquinones such as hydroquinone, hydroquinone monomethyl ether (MEHQ), t-butyl hydroquinone and t-butylcatechol (TBC), quinones such as benzoquinone, anthraquinone, naphthoquinone and toluquinone, amines such as phenyl-β-naphthylamine and para-benzylaminophenol, nitro compounds such as dinitrobenzene, nitroxy compounds such as 4-hydroxy-2,2,6,6-tetramethylpiperidine-1-oxyl (OH-TEMPO), sulfur-containing compounds such as phenothiazine, oxygen molecules (dissolved oxygen) and copper naphthenate. Such an inhibitor may be used in an amount within the range of 2 ppm to 1,000 ppm based on the total amount of the polyepoxide and the ethylenically unsaturated double bond-containing monocarboxylic acid.

(Minute Polymer Particle-Containing Polyepoxide)

The minute polymer particle-containing polyepoxide in the present invention is a composition in which minute polymer particles are dispersed in the form of primary particles in a polyepoxide.

Various methods can be used to obtain this minute polymer particle-containing polyepoxide, and examples thereof include a method of contacting minute polymer particles obtained in the form of an aqueous latex with a polyepoxide followed by removing unwanted components such as water, and a method of mixing minute polymer particles obtained after preliminary extraction to an organic solvent with a polyepoxide followed by removing the organic solvent. The method described in WO 2005/28546 is preferably used, and this particular method for preparing a minute polymer particle-containing polyepoxide used in the present invention preferably includes a first step for obtaining a loose agglomerate of minute polymer particles, a second step for obtaining a minute polymer particle dispersion, and a third step for obtaining a minute polymer particle-containing polyepoxide in that order.

(Application/Cured Product)

The composition of the present invention can be molded using a known molding method such as the hand lay-up method, spray-up method, pultrusion method, filament winding method, matched dye method, pre-preg method, centrifugal molding method, resin transfer molding (RTM) method, vacuum bag molding method or cold press method, and is preferably used in applications such as composite materials of glass fiber or carbon fiber, raw materials of bulk molding compounds (BMC) or sheet molding compounds (SMC), gel coatings, lining materials, coating materials, adhesives, pastes and putties, as well as applications such as adhesives, coating materials and inks which are curable by ultraviolet light or electron beam and in which epoxy acrylates are generally used.

The cured product of the present invention is preferably obtained by curing the curable composition of the present invention by radical polymerization.

Preferable examples of such a curing agent include ketone peroxides such as methyl ethyl ketone peroxide, diacyl peroxides such as benzoyl peroxide, hydroperoxides such as cumene hydroperoxide as well as peroxyketals, dialkyl peroxides, peroxydicarbonates and peroxy esters, and the curing agent is preferably added in an amount of 0.1 to 3 parts by weight relative to 100 parts by weight of the vinyl ester resin in the present invention.

Examples of such a curing accelerator that can be preferably used include organic acid metal salts such as cobalt naphthenate, and N-substituted aromatic amines such as N,N-dimethylaniline and N,N-dimethyl-para-toluidine, and the curing accelerator is preferably added in an amount of 0.01 to 1 part by weight relative to 100 parts by weight of the vinyl ester resin in the present invention.

In addition, the use of a so-called photoinitiator, which generally generates radicals when irradiated with ultraviolet light, enables curing by ultraviolet light (including ultraviolet rays from sunlight). Preferable examples of such photocuring agents include aromatic ketones such as p-tert-butyltrichloroacetophenone, diethoxyacetophenone (DEAP), benzophenone and Michler's ketone (4,4-bis(dimethylamino)benzophenone), benzils such as benzil and benzil dimethyl ketal, benzoins such as benzoin, benzoin alkyl ethers (alkyl=methyl, isopropyl, butyl or the like), and sulfur compounds such as tetramethylthiuram monosulfide (TMS), thioxanthone and 2-chlorothioxanthone, and the photocuring agent is preferably added in an amount of 0.1 to 8 parts by weight relative to 100 parts by weight of the vinyl ester resin in the present invention.

Moreover, this photoinitiator can be used together with a sensitizer, and examples of such sensitizers include amines such as n-butylamine, triethylamine, N-methyldiethanolamine, piperidine, N,N-dimethylaniline, triethylenetetramine and diethylaminoethyl (meth)acrylate, urea compounds such as O-tolylthiourea, sulfur compounds such as s-benzylisothiuronium-p-toluenesulfinate, nitriles such as N,N-dimethyl-p-aminobenzonitrile, and phosphorous compounds such as sodium diethylthiophosphate, and the sensitizer is preferably added in an amount of 0 to 6 parts by weight.

In the case of photocuring with ultraviolet light, an example of typical curing conditions consists of irradiation at 10 mJ/cm$^2$ to 3,000 mJ/cm$^2$ at a wavelength of 200 nm to 600 nm.

There are no particular limitations on the temperature of curing with a radical initiator as described above, and the temperature can be appropriately selected so as to be adapted to the type of initiator and to provide characteristics required for the cured product, as long as it is within the range of −20° C. to 150° C.

(Vinyl Ester Resin)

The vinyl ester resin in the present invention is typically a resinous reaction product obtainable by reacting a polyepoxide (such as an epoxy resin) with an ethylenically unsaturated double bond-containing monocarboxylic acid (such as (meth) acrylic acid), has the same backbone as the polyepoxide in a main chain thereof, and is curable due to the presence of unsaturated double bonds in a molecule thereof.

The above-mentioned backbone is preferably one or more types of backbones selected from the group consisting of backbones of bisphenol A, bisphenol F, phenol novolak, cresol novolak, hydrogenated bisphenol A, hydrogenated bisphenol F, aliphatic ester, aliphatic ether, and aromatic ester types from the viewpoints of cost and handleability, and bisphenol A- and phenol novolak-type backbones are more preferable.

In general, although such vinyl esters have excellent properties of superior acid resistance and rapid curing, they also have the disadvantage of low toughness.

The present invention has been completed in order to compensate for the disadvantage of vinyl ester resins while maintaining their excellent properties, and since the minute polymer particles in the present invention are dispersed in the form of primary particles in the minute polymer particle-containing vinyl ester resin composition, these compensation and maintenance can be effectively achieved. In addition, when the minute polymer particle in the present invention preferably has a rubber core, a cured product having improved mechanical strength can be obtained.

(Polyepoxide)

The polyepoxide in the present invention is an epoxy compound having an epoxy group in a molecule thereof, and from the viewpoint of ensuring the primary dispersion described above, the number average molecular weight thereof is preferably 50 to 4,000 and more preferably 100 to 2,500. The effects of the present invention are particularly effective and particularly preferable in vinyl ester resins that use a polyepoxide having a number average molecular weight of 1,000 or less, for which it has been difficult to improve toughness in the prior art.

Examples of the above-mentioned epoxides include bisphenol A-based epoxy resins, bisphenol F-based epoxy resins, novolak-based epoxy resins, brominated glycidyl ether-based epoxy resins as exemplified by brominated bisphenol A-based epoxy resins, glycidyl ester-based epoxy resins, hydrogenated bisphenol A (or F)-based epoxy resins, glycidyl ether-based epoxy resins, amino-containing glycidyl ether resins, and epoxy compounds obtained by an addition reaction of a compound such as bisphenols A (or F) and polybasic acids with such an epoxy resin, and preferable are bisphenol A-based epoxy resins and phenol novolak-based epoxy resins.

Moreover, in the present invention, a minute polymer particle-containing polyepoxide may be used that is obtained by carrying out a procedure for increasing the epoxy equivalent weight by 25 or more with respect to a minute polymer particle-containing polyepoxide in which the epoxy equivalent weight is less than 500 g/eq, in the presence of its minute polymer particles dispersed in the form of primary particles. Examples of such a modification procedure include a method in which the molecular weight is increased by a reaction among a portion of a minute polymer particle-containing polyepoxide in the presence of a catalyst, a method in which another polyepoxide having a different molecular weight is added so that polyepoxides of different molecular weights are present, followed by a reaction between the polyepoxides, as well as a method in which the molecular weight is increased by a reaction with a phenol compound such as bisphenol A, bisphenol F and resorcin or a dibasic acid (anhydride) such as adipic acid, tetrahydrophthalic anhydride, dimer acids and bi-terminally carboxylated nitrile rubber. This modification procedure can be preferably carried out by stirring at a temperature of 70° C. to 180° C. Examples of the above-mentioned catalyst that can be used include tertiary amines such as dimethylbenzylamine, tributylamine and triethylamine, quaternary ammonium salts such as trimethylbenzylammonium chloride, as well as salts of primary and secondary amines, inorganic salts such as lithium chloride, N-substituted aromatic amines such as N,N-dimethylaniline, imidazole compounds such as 2-ethyl-4-methylimidazole, tri-substituted phosphines such as triphenylphosphine, and quaternary phosphonium salts such as tetrabutyl phosphonium salts. The amount of such a catalyst is preferably within the range of 0.01 to 1 part by weight relative to 100 parts by weight of the total amount of the polyepoxide of the minute polymer particle-containing polyepoxide from the viewpoint of controlling the reaction degree.

(Ethylenically Unsaturated Double Bond-Containing Monocarboxylic Acid)

Examples of the ethylenically unsaturated double bond-containing monocarboxylic acid in the present invention include (meth)acrylic acid, crotonic acid, cinnamic acid, sorbic acid, HE(M)A maleate (reaction product of hydroxyethyl (meth)acrylate and maleic anhydride) and half esters of maleic acid or itaconic acid, and (meth) acrylic acid is preferable from the viewpoints of reactivity and cost.

(Minute Polymer Particle)

The minute polymer particle in the present invention is required to have a volume average primary particle size of 0.05 μm to 1 μl and preferably 0.1 μm to 0.8 μm from the viewpoint of obtaining a highly stable vinyl ester resin with a favorable viscosity, and is preferably a minute polymer particle having a core-shell structure containing at least two layers consisting of an inner core polymer layer and an outermost shell polymer layer, in which the core polymer layer is made of an elastic body having a glass transition temperature of below 0° C. More preferably, the minute polymer particle in the present invention is a minute polymer particle in which a shell polymer layer is formed by graft polymerizing a graft copolymerizable monomer component in the presence of an elastic core layer made of such an elastic body, and in this case, has a structure including an inner elastic core layer and at least one shell polymer layer formed on the surface of the elastic core layer by graft polymerization so as to cover the elastic core layer wholly or partially.

In the present invention, the shell polymer layer relative to the core polymer layer is such that the ratio of the core polymer layer/shell polymer layer (weight ratio of monomers that form each polymer) is preferably within the range of 40/60 to 99/1, and from the viewpoints of achieving a low viscosity of the composition of the present invention, and of sufficiently imparting the effect of improving mechanical strength, which is an effect of the present invention, to a cured product of the composition of the present invention, the shell polymer layer content in the minute polymer particle more preferably corresponds to 60/40 to 90/10 and even more preferably 70/30 to 90/10.

(Core Polymer Layer)

The polymer that forms the core polymer layer (which may also of a multilayer structure) present inside the minute polymer particle is preferably an elastic rubber (i.e. rubber core) preferably having a glass transition temperature (Tg) of below 0° C., more preferably of −20° C. or lower, and even more preferably of −45° C. or lower. This core polymer layer usually has a spherical shape, and in this case, the volume average particle size of the core portion within the minute polymer particle is preferably 0.05 μm to 1 μm and more preferably 0.05 μm to 0.6 μm provided the volume average particle size of the minute polymer particle is within the range of 0.05 μm to 1 μm. The particle size of the core polymer layer can be easily determined by observation using a transmission electron microscope (TEM) after production of a cured product containing the composition of the present invention.

This core polymer layer preferably has a crosslinked structure, and in the case of using such a crosslinked core polymer, the crosslinked core polymer does not dissolve in the vinyl ester resin or vinyl monomer component in the present invention, and does not dissolve in a solvent considered to be a good solvent thereof even though it may swell.

This rubber core is obtained by polymerizing rubber core forming monomers, and according to the type of monomer serving as the main monomer, namely the first monomer among these monomers, examples thereof include diene rubbers obtainable by mainly polymerizing conjugated diene monomers, acrylic rubbers obtainable by mainly polymerizing (meth)acrylate monomers, and polysiloxane rubbers. In addition, combinations or composites of these may be used. From the viewpoint of cost, diene rubbers and acrylic rubbers are preferable. The rubbery-polymer forming monomers may further contain an aromatic vinyl monomer or a vinyl cyan monomer in addition to the first monomer.

Butyl acrylate or 2-ethylhexylacrylate is preferable as the first monomer in the case of an acrylic rubber, while butadiene or isoprene, for example, is preferable as the first monomer in the case of a diene rubber.

(Crosslinking of Rubber Core)

This rubber core preferably has a crosslinked structure introduced into its polymer component obtained by polymerizing the above-mentioned monomers. There are no particular limitations on the method for introducing a crosslinked structure, and a commonly used technique can be employed. An example of the method for introducing a crosslinked structure into the polymer component obtained by polymerizing the above-mentioned monomers includes adding a crosslinkable monomer such as a polyfunctional monomer to be described later to the rubber core forming monomer components followed by polymerization. More specifically, the rubber core has a gel content of preferably 60% by weight or more, more preferably 80% by weight or more, even more preferably 90% by weight or more, and particularly preferably 95% by weight or more. The gel content as used herein refers to the ratio of insoluble matter to the total amount of soluble matter and insoluble matter when about 1.2 g of crumb obtained by coagulation and drying is immersed in 100 g of toluene and left to stand for 24 hours at 23° C. followed by separation of insoluble matter and soluble matter.

(Polyfunctional Monomer)

Examples of the polyfunctional monomer exclude butadiene, and include allylalkyl (meth)acrylates such as allyl (meth)acrylate and allylalkyl (meth)acrylates; allyloxyalkyl (meth)acrylates; polyfunctional (meth)acrylates having two or more (meth)acrylic groups such as (poly)ethylene glycol di(meth)acrylate, butanediol di(meth)acrylate, ethylene glycol di(meth)acrylate, triethylene glycol di(meth)acrylate and tetraethylene glycol di(meth)acrylate; diallyl phthalate, triallyl cyanurate, triallyl isocyanurate and divinylbenzene. Allyl methacrylate, triallyl isocyanurate, butanediol di(meth)acrylate and divinylbenzene are particularly preferable.

(Shell Polymer Layer)

The outmost shell polymer layer of the minute polymer particle is a layer made of a shell polymer obtained by polymerizing shell forming monomers, and it serves to improve compatibility between the minute polymer particle and the vinyl ester resin in the present invention, and enable the minute polymer particles to disperse in the form of primary particles in the curable composition according to the present invention or a cured product thereof.

In the present invention, it may be preferable in some cases to use a polymer having a glass transition temperature (Tg) of below 20° C. particularly from the viewpoint of improving the toughness of a cured product of the composition of the present invention. It may be preferable in some cases to use a polymer that enables the glass transition temperature (Tg) of the shell polymer to be more preferably below 0° C.

This shell polymer is preferably grafted to the above-mentioned rubber core. More precisely, the monomer component used to form the shell polymer layer is preferably graft polymerized to the core polymer that forms the rubber core so that the shell polymer layer and the rubber core are substantially chemically bonded. In other words, the shell polymer is preferably formed by graft polymerizing the shell forming monomers in the presence of the core polymer, and is preferably graft polymerized to cover a portion of or the entire core polymer. This polymerization procedure can be carried out by adding monomers serving as constituents of the shell polymer to a latex of the core polymer that is prepared and present in the form of an aqueous polymer latex, followed by polymerization.

In particular, shell forming monomers (A) preferable for dispersing the minute polymer particles in the form of primary particles in the present invention are 100% by weight of shell forming monomers composed of 30% to 95% by weight of an aromatic vinyl monomer, 5% to 70% by weight of a vinyl cyan monomer, 0% to 55% by weight of an epoxy group-containing (meth)acrylate monomer, 0% to 30% by weight of a polyfunctional vinyl monomer, and 0% to 50% by weight of other vinyl monomers, and more preferably are composed of 40% to 84.5% by weight of styrene, 10% to 40% by weight of acrylonitrile, 5% to 35% by weight of glycidyl methacrylate, 0.5% to 5% by weight of a polyfunctional vinyl monomer, and 0% to 20% by weight of other vinyl monomers.

Shell forming monomers (B) preferable from the viewpoints of dispersing the minute polymer particles in the form of primary particles in the present invention, and particularly improving the toughness of a cured product of the composition of the present invention, are those which provide a shell polymer that is derived from an alkoxyalkyl (meth)acrylate and has a glass transition temperature (Tg) of below 20° C. The content of the alkoxyalkyl (meth)acrylate is preferably 5% to 95% by weight (based on 100% by weight of the shell polymer), and more preferably 30% to 50% by weight.

A more preferable embodiment of the shell forming monomers (B) contains an alkoxyalkyl (meth)acrylate and glycidyl (meth)acrylate, and can further contain a polyfunctional vinyl monomer. Containing a polyfunctional vinyl monomer as a constituent of the shell polymer tends to facilitate lowering of the viscosity of the vinyl ester resin composition of the present invention. In this case, 100% by weight of the shell forming monomers preferably contain 5% to 50% by weight of an alkoxyalkyl (meth)acrylate and 1% to 40% by weight of glycidyl (meth)acrylate. Moreover, 100% by weight of the shell forming monomers (B) more preferably further contain 0% to 20% by weight of a polyfunctional vinyl monomer.

In a preferable method for producing the composition of the present invention, there occurs a chemical change of a medium in which the minute polymer particles are dispersed (namely, a polyepoxide is converted to a vinyl ester). Also during the course of curing the vinyl ester to give a cured product, there occurs an additional chemical change of the medium in which the minute polymer particles are dispersed.

It has been difficult in the prior art to ensure compatibility between a minute polymer particle and a medium and maintain the dispersed state when considerable changes in polarity and viscosity occur following such a chemical change, and thus the particles end up agglomerating during the course of obtaining a vinyl ester from a polyepoxide or obtaining a cured product from a vinyl ester. The prior art neither discloses nor suggests the design of minute polymer particles for maintaining a dispersed state by withstanding such two chemical changes.

In addition, since minute polymer particles disclosed in the prior art can only be dispersed in such a manner that a large number of primary particles have agglomerated, the volume thereof increases and as a result thereof, the minute polymer particles tend to rise toward the surface of the vinyl ester resin, thereby causing a decrease in dispersion stability.

In this context, it is found in the present invention that by employing a specific minute polymer particle structure and shell composition, dispersion of primary particles can be maintained without causing agglomeration of the minute polymer particles even if considerable changes in polarity and viscosity occur as described above. It is also found that the minute polymer particle in an amount exceeding 10 parts by weight relative to 100 parts by weight of the vinyl ester can be stably contained at a handleable viscosity and can achieve a dispersed state that does not change before and after the above-mentioned chemical changes, which have been difficult in the prior art.

The following provides some explanation of the contribution of the above-mentioned shell composition in the present invention to dispersion stability to these changes in polarity and viscosity.

An explanation is first provided regarding the shell forming monomers (A).

The above-mentioned aromatic vinyl monomer is considered to be a monomer used as a part of the shell forming monomers to impart a certain non-polarity to the shell polymer from the viewpoint of compatibility of the shell polymer with the vinyl ester resin in order to ensure the primary dispersion described in the present invention, and it is preferably contained in an amount of 30% to 95% by weight, and more preferably 40% to 84.5% by weight, based on 100% by weight of the shell forming monomers (A). Examples thereof include styrene and vinyltoluene, and preferable is styrene.

The above-mentioned vinyl cyan monomer is considered to be a monomer used as a part of the shell forming monomers (A) to impart a certain polarity to the shell polymer from the same viewpoint as described above, and it is preferably contained in an amount of 5% to 70% by weight, and more preferably 10% to 40% by weight, based on 100% by weight of the shell forming monomers (A). Examples thereof include (meth)acrylonitrile, and preferable is acrylonitrile.

The above-mentioned epoxy group-containing (meth)acrylate monomer is considered to be a monomer used as a part of the shell forming monomers (A) to introduce an epoxy group into the shell polymer, and is used to form a (meth)acrylate group grafted to the minute polymer particle in the present invention by going through the above-mentioned addition reaction of a (meth)acryloyloxy group, and it is preferably contained in an amount of 0% to 55% by weight, and more preferably 5% to 35% by weight, based on 100% by weight of the shell forming monomers (A). Examples thereof include glycidyl (meth)acrylate, and preferable is glycidyl methacrylate.

The above-mentioned polyfunctional vinyl monomer is considered to be a monomer used as a part of the shell forming monomers (A) to prevent swelling of the minute polymer particle in the above-mentioned composition of the present invention and facilitate polymerization of the shell polymer, and it is preferably contained in an amount of 0% to 30% by weight, and more preferably 0.5% to 5% by weight, based on 100% by weight of the shell forming monomers (A). Examples thereof include the same monomers as those listed for the aforementioned polyfunctional monomer, and preferable are allyl methacrylate and triallyl isocyanurate.

The above-mentioned other vinyl monomers are vinyl monomers other than the above-mentioned aromatic vinyl monomer, vinyl cyan monomer, epoxy group-containing (meth)acrylate monomer and polyfunctional vinyl monomer, and examples thereof include alkyl (meth)acrylates that have an alkyl group containing 1 to 8 carbon atoms, and (meth)acrylates that have a functional group other than an epoxy group, such as 2-hydroxyethyl methacrylate, 2-hydroxypropyl methacrylate and 4-hydroxybutyl methacrylate.

An explanation is next provided regarding the shell forming monomers (B).

The above-mentioned alkoxyalkyl (meth)acrylate is a monomer used as a part of the shell forming monomers (B) to impart a certain polarity to the shell polymer from the viewpoint of compatibility of the shell polymer with the vinyl ester resin in order to ensure the primary dispersion described in the present invention, and it is preferably contained in an amount of 5% to 95% by weight, more preferably 10% to 50% by weight, even more preferably 30% to 50% by weight, and particularly preferably 30% to 40% by weight, based on 100% by weight of the shell forming monomers. Examples thereof include 2-methoxyethyl (meth)acrylate, 2-ethoxyethyl (meth)acrylate, 2-(2-ethoxyethoxy)ethyl (meth)acrylate and phenoxyethyl (meth)acrylate, and preferable are 2-methoxyethyl acrylate, 2-ethoxyethyl acrylate and 2-(2-ethoxyethoxy)ethyl acrylate.

The above-mentioned glycidyl (meth)acrylate is considered to be a monomer used as a part of the shell forming monomers to introduce an epoxy group into the shell polymer, and is used to form a (meth)acrylate group grafted to the minute polymer particle in the present invention by going through the above-mentioned addition reaction of a (meth)acryloyloxy group, and it is preferably contained in an amount of 0% to 40% by weight, more preferably 1% to 40% by weight, and even more preferably 1% to 25% by weight, based on 100% by weight of the shell forming monomers (B).

The above-mentioned polyfunctional vinyl monomer is considered to be a monomer used as a part of the shell forming monomers to prevent swelling of the minute polymer particle in the above-mentioned composition of the present invention, and it is preferably contained in an amount of 0% to 20% by weight, and more preferably 0.5% to 5% by weight, based on 100% by weight of the shell forming monomers (B). Examples thereof include the same monomers as those listed for the aforementioned polyfunctional monomer, and preferable are allyl methacrylate and triallyl isocyanurate.

The above-mentioned other vinyl monomers are vinyl monomers other than the above-mentioned alkoxyalkyl (meth)acrylate, glycidyl (meth)acrylate and polyfunctional vinyl monomer, and examples thereof include alkyl (meth) acrylates that have an alkyl group containing 1 to 8 carbon atoms, and (meth)acrylates that have a functional group other than an epoxy group, such as 2-hydroxyethyl methacrylate, 2-hydroxypropyl methacrylate and 4-hydroxybutyl methacrylate.

(Vinyl Monomer)

The vinyl monomer in the present invention is a component that is added to the above-mentioned minute polymer particle-containing epoxy(meth)acrylate and has a function to provide required properties and performances to a cured product of the minute polymer particle-containing vinyl ester resin composition of the present invention.

Examples of the vinyl monomer include aromatic vinyl monomers, (meth)acrylate monomers and allyl monomers.

Examples of the aromatic vinyl monomers include styrene, α-methylstyrene, vinyltoluene and divinylbenzene.

Examples of the (meth)acrylate monomers include alkyl (meth)acrylates that have an alkyl group containing 1 to 10 carbon atoms, and hydroxyethyl (meth)acrylate, as well as bifunctional (meth)acrylates such as butanediol di(meth) acrylate, 1,6-hexanediol di(meth)acrylate and di(meth)acrylates having a glycol structure, and polyfunctional (meth) acrylates such as trimethylolpropane tri(meth)acrylate.

Examples of the allyl esters include diallyl (iso)phthalate and triallyl isocyanurate.

EXAMPLES

The following indicates examples and comparative examples of the present invention. The present invention is not limited to these examples.

(1) Volume Average Particle Size of Minute polymer Particle

The volume average particle size of minute polymer particles was measured in a manner described below using a particle size measuring device (Nikkiso Co., Ltd., Microtrac UPA). Minute polymer particles (CS-1 to CS-7) in the form of an aqueous latex were measured after diluting with water. In addition, the particle size was measured with solutions in methyl ethyl ketone of minute polymer particle-containing polyepoxide compositions (ECS-1 to ECS-7) and minute polymer particle-containing vinyl ester resin compositions (VEM-1 to VEM-7).

(2) Measurement of Epoxy Equivalent Weight (EEW)

EEW as described in Example 5 was measured in accordance with ISO-3001.

(3) Measurement of Acid Value of Vinyl Ester Resin Composition

The acid value was measured in accordance with JIS K6901. Specifically, an accurately weighed sample was dissolved in 25 mL of acetone (reagent grade) under gentle heating on a hot plate, 5 drops of phenolphthalein indicator were then added and titrated, while stirring, with a 0.1N potassium hydroxide (KOH) solution. The point at which a pink color had been maintained for 20 seconds or more was defined as the endpoint. A blank test was also carried out using the same procedure but no sample was added. An amount of 0.7 g to 3 g of a sample was accurately weighed according to the acid value.

(4) Viscosity of Compositions in Examples

The viscosity was measured by a Bohlin CVOR rheometer manufactured by Malvern Instruments Ltd with a cone-plate geometry using a cone having a diameter of 40 mm.

(5) Measurement of Fracture Toughness Value (K1c)

An SENB specimen having W=12.5 mm and B=4 mm was prepared in accordance with ASTM D5045 followed by measurement at a temperature of 23° C. and a crosshead speed of 1 mm/min. The unit of the K1c value as used herein is MPa*m$^{0.5}$.

(6) Measurement of Glass Transition Temperature (Tg) of Cured Product (of Vinyl Ester Resin Composition)

The tan δ peak temperature was measured as a Tg value in accordance with an established method at a frequency of 1 Hz and a rate of temperature increase of 4° C./rain using a DVA-200 dynamic viscoelastic analyzer (IT KEISOKU SEIGYO K.K.).

(7) Evaluation (or Measurement) Method of Tg of Polymer of Shell Forming Monomers The glass transition temperature (Tg) of a shell polymer was calculated based on the Fox equation: $1/Tg=\Sigma(W_x/T_x)$ (wherein, Tg: glass transition temperature of copolymer, $W_x$: weight fraction of monomer x, $T_x$: glass transition temperature of homopolymer of monomer x) using reference values for glass transition temperature of homopolymers of monomers forming the polymer. For example, in the case the polymer is derived from three components a, b and c, the glass transition temperature is determined by $1/Tg=W_a/T_a+W_b/T_b+W_c/T_c$. The following values were used as glass transition temperature values of homopolymers used in the calculation in the present examples.

Poly(ethyl acrylate): −24° C.
Poly(n-butyl acrylate): −54° C.
Poly(2-methoxyethyl acrylate): −50° C.
Poly(glycidyl methacrylate): 78° C.
Polystyrene: 100° C.
Polyacrylonitrile: 97° C.

On the other hand, in the case the glass transition temperature cannot be calculated using the above-mentioned method, the glass transition temperature of the shell polymer can also be determined by an analytical technique. Specifically, examples of the analytical technique include: (1) a method in which core-shell-type minute polymer particles in the form of an aqueous latex are treated by a method such as salting out or spray drying to obtain the polymer fraction as a solid, followed by pressing under heating, typically at a temperature of 130° C. to 180° C., to form a sheet for use as a sample, and (2) a method using a cured product of a vinyl ester resin composition containing a core-shell-type minute polymer particle, and the glass transition temperature can then be determined in a usual manner from a value of tan δ observed by analyzing either of these samples with a dynamic viscoelastic analyzer (Dynamic Mechanical Analyzer (DMA) measurement).

(Production of Minute Polymer Particle CS-1 Having Acrylic Rubber Core)

After charging 800 g of water, 0.2 g of sodium dodecylbenzene sulfonate, 0.25 g of tripotassium phosphate, 5 mg of iron (II) sulfate hexahydrate, 20 mg of EDTA (ethylenediaminetetraacetic acid) and 0.8 g of sodium formaldehyde sulfoxylate into a 3 L glass reaction vessel under a nitrogen atmosphere and heating to 40° C., a mixture of 410 g of butyl acrylate, 12.3 g of allyl methacrylate and 0.2 g of cumene hydroperoxide was added over the course of 300 minutes followed by continuous stirring for 120 minutes. During this time, sodium dodecylbenzene sulfonate was added in three portions (total of 8 g). An aqueous latex of a core polymer mainly derived from butyl acrylate was obtained in this manner.

Subsequently, 200 g of water was added to this aqueous core polymer latex followed by addition of a mixture consisting of a monomer mixture, composed of 55 g of styrene, 20 g of acrylonitrile and 15 g of glycidyl methacrylate (shell forming monomers (A)), and 0.08 g of t-butyl hydroperoxide over the course of 120 minutes under continuous stirring in a nitrogen atmosphere to carry out graft polymerization. Following completion of the addition of the monomer mixture, stirring was further continued for 2 hours to complete the reaction and obtain minute polymer particles (CS-1) in the form of an aqueous latex. The polymerization conversion rate was 99%. The Tg of this polymer of the shell forming monomers, namely the shell polymer, was 96° C. (calculated value). Measurement of the volume average particle size of the minute polymer particles was carried out with a particle size measuring device (Nikkiso Co., Ltd., Microtrac UPA) after diluting the minute polymer particles in the form of an aqueous latex with water. The measured value was 0.2 µm and a sharp, monodisperse particle size distribution was shown.
(Production of Minute Polymer Particle CS-2 Having Diene Rubber Core)

After placing 200 parts of water, 0.03 parts of tripotassium phosphate, 0.25 parts of potassium dihydrogen phosphate, 0.002 parts of ethylenediaminetetraacetic acid, 0.001 parts of ferrous sulfate and 1.5 parts of sodium dodecylbenzene sulfonate in a 100 L pressure-proof polymerization vessel and removing oxygen by sufficiently replacing the atmosphere inside the vessel with nitrogen and reducing pressure, the temperature was raised to 40° C. and 75 parts of butadiene and 25 parts of styrene were added to the system. Polymerization was initiated by adding 0.015 parts of para-menthane hydroperoxide and then adding 0.04 parts of sodium formaldehyde sulfoxylate. An amount of 0.01 parts of para-menthane hydroperoxide, 0.0015 parts of ethylenediaminetetraacetic acid and 0.001 parts of ferrous sulfate were added four hours after the start of polymerization. After ten hours of polymerization, residual monomers were removed under reduced pressure to terminate the polymerization, whereby an aqueous latex of core polymer particles comprising a styrene-butadiene copolymer was obtained. The polymerization conversion rate was 98%.

An amount of 1155 g of this aqueous latex of core polymer particles (containing 375 g of styrene-butadiene rubber particles) was charged into a 3 L glass vessel followed by addition of 440 g of pure water. After adding 0.8 g of sodium formaldehyde sulfoxylate thereto while stirring at 60° C. in a nitrogen atmosphere, a mixture consisting of a monomer mixture of 65 g of styrene, 30 g of acrylonitrile and 30 g of glycidyl methacrylate (shell forming monomers (A)) and 0.13 g of t-butyl hydroperoxide was added over the course of 150 minutes to carry out graft polymerization. Following completion of the addition of the monomer mixture, stirring was further continued for 2 hours to complete the reaction. The polymerization conversion rate was 99%. Measurement of the particle size of the minute polymer particles was carried out with a particle size measuring device (Nikkiso Co., Ltd., Microtrac UPA) after diluting the minute polymer particles in the form of an aqueous latex with water. The measured particle size was 0.1 µm, and a sharp, monodisperse particle size distribution was shown.

(Production of Minute Polymer Particle CS-3 Having Acrylic Rubber Core)

An aqueous latex of a core polymer mainly derived from butyl acrylate was prepared as described in the production of CS-1, followed by addition of 200 g of water thereto, adding a mixture consisting of a monomer mixture, composed of 55 g of styrene, 20 g of acrylonitrile, 15 g of glycidyl methacrylate and 2.3 g of allyl methacrylate (shell forming monomers (A)), and 0.09 g of butyl hydroperoxide over the course of 120 minutes under continuous stirring in a nitrogen atmosphere to carry out graft polymerization. Following completion of the addition of the monomer mixture, stirring was further continued for 2 hours to complete the reaction and obtain minute polymer particles (CS-3) in the form of an aqueous latex. The polymerization conversion rate was 99%. A portion of this aqueous latex was coagulated with a 3% magnesium sulfate solution, rinsed with water and dried to obtain a solid polymer fraction, and the resulting solid was then formed into a sheet by hot-pressing at 180° C. Using this sheet, DMA analysis was carried out on the core-shell-type minute polymer particle CS-3, and as a result, the Tg of this polymer of the shell forming monomers, namely the shell polymer, was 93° C. (as measured by DMA). The volume average particle size of the minute polymer particles in the form of an aqueous latex was 0.2 µm and a sharp, monodisperse particle size distribution was shown.
(Production of Minute Polymer Particle CS-4 Having Diene Rubber Core)

An aqueous latex of core polymer particles comprising a styrene-butadiene copolymer as described in the production of CS-2 was used as is, and 1155 g of this aqueous latex of core polymer particles (containing 375 g of styrene-butadiene rubber particles) was charged into a 3 L glass vessel followed by addition of 440 g of pure water. After adding 10 g of triallyl isocyanurate (TAIL) thereto while stirring at 60° C. in a nitrogen atmosphere, 0.02 g of cumene hydroperoxide and 0.8 g of sodium formaldehyde sulfoxylate were added followed by stirring for 1 hour. Subsequently, a mixture consisting of a monomer mixture, composed of 65 g of styrene, 30 g of acrylonitrile and 30 g of glycidyl methacrylate (shell forming monomers (A)), and 0.09 g of t-butyl hydroperoxide was added over the course of 120 minutes to carry out graft polymerization. Following completion of the addition of the monomer mixture, stirring was further continued for 2 hours to complete the reaction and obtain minute polymer particles in the form of an aqueous latex. The polymerization conversion rate was 99%. The volume average particle size of the minute polymer particles in the form of an aqueous latex was 0.2 µm and a sharp, monodisperse particle size distribution was shown.
(Production of Minute Polymer Particle CS-5 Having Acrylic Rubber Core)

After charging 800 g of water, 0.12 g of sodium dodecylbenzene sulfonate, 0.25 g of tripotassium phosphate, 5 mg of iron (II) sulfate hexahydrate, 20 mg of EDTA (ethylenediaminetetraacetic acid) and 0.8 g of sodium formaldehyde sulfoxylate into a 3 L glass reaction vessel under a nitrogen atmosphere and heating to 40° C., a mixture of 400 g of butyl acrylate, 12 g of allyl methacrylate and 0.2 g of cumene hydroperoxide was added over the course of 300 minutes followed by continuous stirring for 120 minutes. During this time, sodium dodecylbenzene sulfonate was added in three portions (total of 8 g). An aqueous latex of a core polymer mainly derived from butyl acrylate was obtained in this manner.

Subsequently, 200 g of water was added to this aqueous core polymer latex followed by addition of a mixture consisting of a monomer mixture, composed of 60 g of styrene, 20 g of acrylonitrile, 20 g of glycidyl methacrylate and 2.5 g of allyl methacrylate (shell forming monomers (A)), and 0.08 g of t-butyl hydroperoxide over the course of 120 minutes under continuous stirring in a nitrogen atmosphere to carry out graft polymerization. Following completion of the addition of the monomer mixture, stirring was further continued for 2 hours to complete the reaction and obtain minute polymer particles (CS-5) in the form of an aqueous latex. The polymerization conversion rate was 99%. Measurement of the volume average particle size of the minute polymer particles was carried out with a particle size measuring device (Nikkiso Co., Ltd., Microtrac UPA) after diluting the minute polymer particles in the form of an aqueous latex with water. The measured value was 0.2 µm, and a sharp, monodisperse particle size distribution was shown.

(Production of Minute Polymer Particle CS-6 Having Acrylic Rubber Core)

After charging 800 g of water, 0.12 g of sodium dodecylbenzene sulfonate, 0.25 g of tripotassium phosphate, 5 mg of iron (II) sulfate hexahydrate, 20 mg of EDTA (ethylenediaminetetraacetic acid) and 0.8 g of sodium formaldehyde sulfoxylate into a 3 L glass reaction vessel under a nitrogen atmosphere and heating to 40° C., a mixture of 375 g of butyl acrylate, 11.3 g of allyl methacrylate and 0.2 g of cumene hydroperoxide was added over the course of 270 minutes followed by continuous stirring for 120 minutes. During this time, sodium dodecylbenzene sulfonate was added in three portions (total of 8 g). An aqueous latex of a core polymer mainly derived from butyl acrylate was obtained in this manner.

Subsequently, 200 g of water was added to this aqueous core polymer latex followed by addition of a mixture consisting of a monomer mixture, composed of 65 g of styrene, 30 g of acrylonitrile, 30 g of glycidyl methacrylate and 3.2 g of allyl methacrylate (shell forming monomers (A)), and 0.1 g of t-butyl hydroperoxide over the course of 120 minutes under continuous stirring in a nitrogen atmosphere to carry out graft polymerization. Following completion of the addition of the monomer mixture, stirring was further continued for 2 hours to complete the reaction and obtain minute polymer particles (CS-6) in the form of an aqueous latex. The polymerization conversion rate was 99%. Measurement of the volume average particle size of the minute polymer particles was carried out with a particle size measuring device (Nikkiso Co., Ltd., Microtrac UPA) after diluting the minute polymer particles in the form of an aqueous latex with water. The measured value was 0.2 µm, and a sharp, monodisperse particle size distribution was shown.

(Production of Minute Polymer Particle CS-7 Having Acrylic Rubber Core)

After charging 800 g of water, 0.12 g of sodium dodecylbenzene sulfonate, 0.25 g of tripotassium phosphate, 5 mg of iron (II) sulfate hexahydrate, 20 mg of EDTA (ethylenediaminetetraacetic acid) and 0.8 g of sodium formaldehyde sulfoxylate into a 3 L glass reaction vessel under a nitrogen atmosphere and heating to 40° C., a mixture of 410 g of butyl acrylate, 14.4 g of allyl methacrylate and 0.2 g of cumene hydroperoxide was added over the course of 300 minutes followed by continuous stirring for 120 minutes. During this time, sodium dodecylbenzene sulfonate was added in three portions (total of 8 g). An aqueous latex of a core polymer mainly derived from butyl acrylate was obtained in this manner.

Subsequently, 200 g of water was added to this aqueous core polymer latex followed by addition of a mixture consisting of a monomer mixture, composed of 52.5 g of styrene, 17.5 g of acrylonitrile, 20 g of glycidyl methacrylate and 1.8 g of allyl methacrylate (shell forming monomers (A)), and 0.09 g of t-butyl hydroperoxide over the course of 120 minutes under continuous stirring in a nitrogen atmosphere to carry out graft polymerization. Following completion of the addition of the monomer mixture, stirring was further continued for 2 hours to complete the reaction and obtain minute polymer particles (CS-7) in the form of an aqueous latex. The polymerization conversion rate was 99%. Measurement of the volume average particle size of the minute polymer particles was carried out with a particle size measuring device (Nikkiso Co., Ltd., Microtrac UPA) after diluting the minute polymer particles in the form of an aqueous latex with water. The measured value was 0.2 µm, and a sharp, monodisperse particle size distribution was shown.

(Production of Minute Polymer Particle-Containing Polyepoxide Compositions (ECS-1 to ECS-7))

The minute polymer particles CS-1 to CS-7 in the form of an aqueous latex were treated according to the method described in WO 2005/28546 using methyl ethyl ketone, and mixed into a bisphenol A-based epoxy resin (Epikote 828EL, EEW=187, Japan Epoxy Resins Co., Ltd.) to respectively obtain minute polymer particle-containing polyepoxide compositions (ECS-1 to ECS-7) each containing 25% by weight of the minute polymer particle in the bisphenol A-based epoxy resin.

The particle size of the minute polymer particles was measured with a particle size measuring device (Nikkiso Co., Ltd., Microtrac UPA) after diluting the compositions with methyl ethyl ketone, and as a result, the measured average particle sizes were as respectively indicated below. All of the compositions showed a sharp, monodisperse particle size distribution similar to that of the minute polymer particles in the form of an aqueous latex, and no agglomerate was observed.

ECS-1: 0.2 µm
ECS-2: 0.1 µm
ECS-3: 0.2 µm
ECS-4: 0.1 µm
ECS-5: 0.2 µm
ECS-6: 0.2 µm
ECS-7: 0.2 µm

Example 1

Production of Minute Polymer Particle-Containing Vinyl Ester Resin Composition

An amount of 88 g of the minute polymer particle-containing polyepoxide (ECS-1) and 22.1 g of a bisphenol A-based epoxy resin (Epikote 828EL, 187 g/eq, Japan Epoxy Resins Co., Ltd.) were charged into a 500 mL separable flask followed by heating to 120° C. while stirring. After adding thereto a solution of 40.6 g of methacrylic acid with 0.061 g of hydroquinone monomethyl ether (MEHQ) and 0.006 g of mono-tertiary butyl hydroquinone dissolved therein, and uniformly mixing the mixture, 0.39 g of N,N-dimethylbenzylamine was added to react for 2.7 hours at 115° C. to 120° C. in a mixed nitrogen/oxygen gas atmosphere containing 6% by volume of oxygen. The acid value of the resulting minute polymer particle-containing epoxy methacrylate was 13 mgKOH/g. An amount of 69.3 g of styrene monomer was then added to the flask to obtain 220 g of a minute polymer particle-containing vinyl ester resin composition (VEM-1) (minute polymer particle content: 10% by weight, vinyl ester resin: 90% by weight, ratio of epoxy methacrylate/styrene monomer: 65/35 (charged weight ratio), viscosity: 1.2 Pa·s (25° C.)).

An amount of 50 g of the minute polymer particle-containing vinyl ester resin obtained in this manner was mixed with 46.2 g of a commercially available vinyl ester resin (Neopol 8250L, bisphenol A-based vinyl ester resin, Japan U-Pica Company Ltd.) and 3.8 g of styrene monomer followed by further adding 0.095 g of N,N-dimethylaniline thereto and uniformly mixing the mixture. Finally, 1.9 g of a benzoyl peroxide paste (Luperox ACT50, Arkema, Inc., purity: 50% by weight) was added followed by curing at room temperature. Generation of heat was observed about 30 minutes later and the mixture gelled. After being left to stand for 1 day at room temperature, the mixture was postcured for 4 hours at 60° C. The resulting cured product was observed with a transmission electron microscope (TEM) to analyze the dispersion of the minute polymer particles. As a result, the minute polymer particles were found to be uniformly dispersed as primary particles without agglomeration, and the dispersed particle size was 0.2 μm. The fracture toughness value (K1c) of this cured product was 1.2 MPa*m$^{0.5}$.

Example 2

Production of Minute Polymer Particle-Containing Vinyl Ester Resin Composition

An amount of 112.8 g of the minute polymer particle-containing polyepoxide (ECS-2) and 0.4 g of a bisphenol A-based epoxy resin (Epikote 828EL, 187 g/eq, Japan Epoxy Resins Co., Ltd.) were charged into a 500 mL separable flask followed by heating to 100° C. while stirring. After adding thereto a solution of methacrylic acid (39.1 g) with 0.107 g of hydroquinone monomethyl ether (MEHQ) and 0.006 g of 4-hydroxy-2,2,6,6-tetramethylpiperidine-1-oxyl (OH-TEMPO) dissolved therein and uniformly mixing the mixture, 0.37 g of N,N-dimethylbenzylamine was added to react for 3.3 hours at 110° C. to 115° C. in an air atmosphere. The acid value of the resulting minute polymer particle-containing epoxy methacrylate was 16. An amount of 82.7 g of styrene monomer was then added to the flask to obtain 235 g of a minute polymer particle-containing vinyl ester resin composition (VEM-2) (minute polymer particle content: 12% by weight, vinyl ester resin: 88% by weight, ratio of epoxy methacrylate/styrene monomer: 60/40 (charged weight ratio), viscosity: 0.8 Pa*s (25° C.)). Measurement of the volume average particle size of the minute polymer particles in this vinyl ester resin (VEM-2) was carried out in the same manner as in Example 1. The measured value was 0.1 μm, and a sharp, monodisperse particle size distribution was shown.

An amount of 50 g of the vinyl ester resin obtained in this manner was mixed with 50 g of a commercially available vinyl ester rein (Neopol 8250L, Japan U-Pica Company Ltd.) followed by further adding 0.095 g of N,N-dimethylaniline and 1.9 g of a benzoyl peroxide paste (LuperoxACT50, Arkema, Inc., purity: 50% by weight) thereto in the same manner as in Example 1 and curing the mixture using the same procedure as in Example 1. The dispersion of the minute polymer particles in the cured product was observed using the same procedure as in Example 1. As a result, the minute polymer particles were found to be uniformly dispersed as primary particles without agglomeration, and the dispersed particle size was 0.11 μm. The fracture toughness value (K1c) of this cured product was 1.2 MPa*m$^{0.5}$.

Example 3

Production of Minute Polymer Particle-Containing Vinyl Ester Resin Composition

The reaction was carried out for 2.7 hours using all the same procedures as in Example 1 except that unlike Example 1, ECS-3 was used as the minute polymer particle-containing polyepoxide, and the acid value of the resulting minute polymer particle-containing epoxy methacrylate was 11 mgKOH/g. Styrene monomer (same amount) was then added and mixed in the same manner as in Example 1 to obtain 220 g of a minute polymer particle-containing vinyl ester resin composition (VEM-3) (minute polymer particle content: 10% by weight, vinyl ester resin: 90% by weight, ratio of epoxy methacrylate/styrene monomer: 65/35 (charged weight ratio), viscosity: 0.7 Pa*s (25° C.)).

An amount of 50 g of the minute polymer particle-containing vinyl ester resin obtained in Example 3 was mixed with Neopol 8250L and styrene monomer using the same procedure as in Example 1 followed by curing using N,N-dimethylaniline and a benzoyl peroxide paste. The resulting cured product was observed with a transmission electron microscope (TEM) to analyze the dispersion of the minute polymer particles. As a result, the minute polymer particles were found to be uniformly dispersed as primary particles without agglomeration, and the dispersed particle size was 0.2 μm. The fracture toughness value (K1c) of this cured product was 1.2 MPa*m$^{0.5}$.

In addition, 47 g of the minute polymer particle-containing vinyl ester resin obtained in Example 3 was cured with N,N-dimethylaniline and a benzoyl peroxide paste (Luperox ACT50) using the same procedure as in Example 1 except that it was mixed with 50 g of a commercially available vinyl ester resin (Neopol 8450, novolak-based vinyl ester resin, Japan U-Pica Company Ltd.) and 3 g of styrene monomer. Generation of heat was observed about 30 minutes later. As a result of analysis of the dispersion of the minute polymer particles, the minute polymer particles were found to be uniformly dispersed as primary particles without agglomeration, and the dispersed particle size was 0.2 μm. The fracture toughness value (K1c) of this cured product was 1.2 MPa*m$^{0.5}$.

Example 4

Production of Minute Polymer Particle-Containing Vinyl Ester Resin Composition

The reaction was carried out for 3.3 hours using all the same procedures as in Example 2 except that unlike Example 2, ECS-4 was used as the minute polymer particle-containing polyepoxide. The acid value of the resulting minute polymer particle-containing epoxy methacrylate was 15 mgKOH/g.

Styrene monomer (same amount) was then added and mixed in the same manner as in Example 1 to obtain 235 g of a minute polymer particle-containing vinyl ester resin composition (VEM-4) (minute polymer particle content: 12% by weight, vinyl ester resin: 88% by weight, ratio of epoxy methacrylate/styrene monomer: 60/40 (charged weight ratio), viscosity: 0.5 Pa*s (25° C.)).

An amount of 50 g of the minute polymer particle-containing vinyl ester resin obtained in Example 4 was mixed with Neopol 8250L using the same procedure as in Example 2 followed by curing using N,N-dimethylaniline and a benzoyl peroxide paste. The resulting cured product was observed with a transmission electron microscope (TEM) to analyze the dispersion of the minute polymer particles. As a result, the minute polymer particles were found to be uniformly dispersed as primary particles without agglomeration, and the dispersed particle size was 0.1 μm. The fracture toughness value (K1c) of this cured product was 1.2 MPa*m$^{0.5}$.

Example 5

Production of Minute Polymer Particle-Containing Vinyl Ester Resin Composition

An amount of 82.8 g of the minute polymer particle-containing polyepoxide (ECS-5) and 20.4 g of a bisphenol A-based epoxy resin (Epikote 828EL, 187 g/eq) were charged into a 500 mL separable flask followed by charging 4.1 g of bisphenol A into the 500 mL separable flask and heating to 80° C. Here, since the epoxy equivalent weight (EEW) of the minute polymer particle-containing polyepoxide (ECS-5) was found to be 248 g/eq as a result of measuring using the previously described method, the EEW of the mixture of 82.8 g of the minute polymer particle-containing polyepoxide (ECS-5) and 20.4 g of the bisphenol A-based epoxy resin (Epikote 828EL, 187 g/eq) before the mixing of bisphenol A was (82.8+20.4)/(82.8/248+20.4/187)=233 g/eq. Next, 0.12 g of N,N-dimethylbenzylamine was added thereto under stirring. Subsequently, the mixture was heated to 150° C. and allowed to react for 1.5 hours to obtain a minute polymer particle-containing polyepoxide having an EEW=266 g/eq. Subsequently, after lowering the temperature to 120° C., a solution of 34.8 g of methacrylic acid with 0.084 g of hydroquinone monomethyl ether (MEHQ) and 0.009 g of mono-tertiary butyl hydroquinone dissolved therein was added and uniformly mixed, followed by again adding 0.18 g of N,N-dimethylbenzylamine to react for 3 hours at 120° C. to 125° C. in a mixed nitrogen/oxygen gas atmosphere containing 6% by volume of oxygen. The acid value of the resulting minute polymer particle-containing epoxy methacrylate was 15 mgKOH/g. To the flask, 87.9 g of styrene monomer was then added and mixed to obtain 230 g of a minute polymer particle-containing vinyl ester resin composition (VEM-5) (minute polymer particle content: 9% by weight, vinyl ester resin: 91% by weight, ratio of epoxy methacrylate/styrene monomer: 58/42 (charged weight ratio)). Measurement of the volume average particle size of the minute polymer particles was carried out with a particle size measuring device (Microtrac UPA) after diluting this vinyl ester resin (VEM-5) with methyl ethyl ketone. The measured value was 0.2 μm, and a sharp, monodisperse particle size distribution was shown.

An amount of 50 g of the minute polymer particle-containing vinyl ester resin obtained in this manner was mixed with 50 g of a commercially available vinyl ester resin (Neopol 8250L, Japan U-Pica Company Ltd.) followed by curing using N,N-dimethylaniline and a benzoyl peroxide paste in the same manner as in Example 2. The resulting cured product was observed with a transmission electron microscope (TEM) to analyze the dispersion of the minute polymer particles. As a result, the minute polymer particles were found to be uniformly dispersed as primary particles without agglomeration, and the dispersed particle size was 0.2 μm.

Example 6

Production of Minute Polymer Particle-Containing Vinyl Ester Resin Composition

An amount of 93.6 g of the minute polymer particle-containing polyepoxide (ECS-6), 0.8 g of a bisphenol A-based epoxy resin (Epikote 828EL, 187 g/eq) and 17.8 g of a phenol novolak-based epoxy resin (Epalloy 8250, CVC Specialty Chemicals Inc., 174 mg/eq) were charged into a 500 mL separable flask and heated to 120° C. A solution of 41.3 g of methacrylic acid with 0.123 g of hydroquinone monomethyl ether (MEHQ) and 0.003 g of 4-hydroxy-2,2,6,6-tetramethylpiperidine-1-oxyl (OH-TEMPO) dissolved therein was added thereto and uniformly mixed, followed by adding 0.3 g of N,N-dimethylbenzylamine under stirring to react for 3 hours at 115° C. to 120° C. in a mixed nitrogen/oxygen gas atmosphere containing 8% by volume of oxygen. The acid value of the resulting minute polymer particle-containing epoxy methacrylate was 18 mgKOH/g. To the flask, 106.5 g of styrene monomer was then added and mixed to obtain 260 g of a minute polymer particle-containing vinyl ester resin composition (VEM-6) (minute polymer particle content: 9% by weight, vinyl ester resin: 91% by weight, ratio of epoxy methacrylate/styrene monomer: 55/45 (charged weight ratio)). Measurement of the volume average particle size of the minute polymer particles was carried out with a particle size measuring device (Microtrac UPA) after diluting this vinyl ester resin (VEM-6) with methyl ethyl ketone. The measured value was 0.2 μl, and a sharp, monodisperse particle size distribution was shown.

Example 7

Production of Minute Polymer Particle-Containing Vinyl Ester (Epoxy Acrylate) Resin Composition An amount of 76.8 g of the minute polymer particle-containing polyepoxide (ECS-7) and 44 g of a bisphenol A-based epoxy resin (Epikote 828EL, 187 g/eq) were charged into a 500 mL separable flask and heated to 120° C. under stirring. A solution of 39.2 g of acrylic acid with 0.072 g of hydroquinone monomethyl ether (MEHQ), 0.005 g of mono-tertiary butyl hydroquinone and 0.002 g of 4-hydroxy-2,2,6,6-tetramethylpiperidine-1-oxyl (OH-TEMPO) dissolved therein was added thereto and uniformly mixed, followed by adding 0.42 g of N,N-dimethylbenzylamine to react for 4 hours at 115° C. to 120° C. in a mixed nitrogen/oxygen gas atmosphere containing 8% by volume of oxygen to obtain 160 g of a minute polymer particle-containing vinyl ester (epoxy acrylate) resin composition (VEM-7) (acid value=9 mgKOH/g, minute polymer particle content: 12% by weight, vinyl ester resin (epoxy acrylate resin): 88% by weight, viscosity: 6 Pa*s (70° C.)). As a result of measuring the volume average particle size of the minute polymer particles in this vinyl ester resin (VEM-7) in the same manner as in Example 1, the measured value was 0.2 μm, and a sharp, monodisperse particle size distribution was shown.

After mixing 3.2 g of SR-454 (ethoxylated (3 mol) trimethylolpropane triacrylate, Sartomer Company, Inc.) and 4.8 g of isobornyl acrylate into 9.1 g of this minute polymer particle-containing vinyl ester resin composition (VEM-7), 0.8 g of benzoin isopropyl ether as a photoinitiator and 0.32 g of N-methyldiethanolamine as a photosensitizer were added followed by diluting with 2.4 g of methyl ethyl ketone to obtain a photocurable composition. This was then coated onto a polycarbonate (PC) substrate having a thickness of 0.5 mm with a bar coater (#20), and immediately dried for 20 seconds in a convection oven at 80° C. Then, the composition was cured at a cumulative amount of light of 800 mJ/cm$^2$ with a 120 W/cm metal halide lamp using a UV irradiation device (ECS-301, Eye Graphics Co., Ltd.). The cured coated film on the PC substrate was observed with a transmission electron microscope (TEM) to analyze the dispersion of the minute polymer particles. As a result, the minute polymer particles were found to be uniformly dispersed as primary particles without agglomeration, and the dispersed particle size was 0.2 μm. Furthermore, the thickness of this cured coated film was 1 mil, and as a result of measuring the turbidity of the coated film on the PC substrate as a whole, the measured value was Hz=3 and the surface gloss (60 degree gloss value) was 139.

Comparative Example 1

An amount of 1155 g of an aqueous latex of a core polymer mainly comprising a styrene-butadiene rubber (containing 375 g of styrene-butadiene rubber particles) as obtained using the procedure described in Example 2 was charged into a 3 L glass vessel followed by addition of 440 g of pure water. A monomer mixture composed of 62 g of methyl methacrylate, 38 g of styrene and 0.1 g of t-butyl hydroperoxide as a monomer mixture that is not the shell forming monomers (A) was added thereto over the course of 120 minutes while stirring at 60° C. in a nitrogen atmosphere to carry out graft polymerization. Following completion of the addition of the monomer mixture, stirring was further continued for 2 hours to complete the reaction. The polymerization conversion rate was 99%. The volume average particle size of the resulting minute polymer particles (CS-1C) in the form of an aqueous latex was 0.1 μm, and a sharp, monodisperse particle size distribution similar to CS-2 of Example 2 was shown.

Calcium chloride was added to this aqueous latex of CS-1C. Then, the minute polymer particles (grafted rubber particles) (CS-1C) were coagulated, dehydrated, and then dried for 1 day at 50° C. to obtain a powder of (CS-1C).

After adding 100 g of the powder of (CS-1C) to 900 g of a commercially available vinyl ester resin (Neopol 8250L, Japan U-Pica Company Ltd.), the mixture was mixed until large clumps of (CS-1C) were no longer present while heating to an upper limit of 60° C. with a homogenizer (Tokushu Kika Kogyo Co., Ltd.) to obtain a vinyl ester resin composition (VEM-1C) containing 10% by weight of the minute polymer particle (CS-1C). Furthermore, although 200 g of the powder of (CS-1C) was added to 800 g of the same vinyl ester resin (Neopol 8250L) and attempted to be mixed, the mixture was in a dry state so that it was unable to be mixed with a homogenizer.

An amount of 50 g of the minute polymer particle-containing vinyl ester resin composition (VEM-1C) obtained in this manner was mixed with 50 g of a commercially available vinyl ester resin (Neopol 8250L, Japan U-Pica Company Ltd.), and cured using N,N-dimethylaniline and a benzoyl peroxide paste in the same manner as in Example 2. Generation of heat was observed about 45 minutes later and the mixture gelled. The resulting cured product was observed with a transmission electron microscope (TEM) to analyze the dispersion of the minute polymer particles (CS-1C) in the cured product. As a result, the CS-1C particles were found to be dispersed in the form of agglomerates, and nearly all the particles were dispersed at 0.7 μm to 2 μm. The fracture toughness value (K1c) of this cured product was 0.9 MPa*m$^{0.5}$.

Comparative Example 2

An amount of 1300 g of an aqueous latex of a core polymer mainly comprising a styrene-butadiene rubber (containing 420 g of styrene-butadiene rubber particles) as obtained using the procedure described in Example 2 was charged into a 3 L glass vessel followed by addition of 440 g of pure water and stirring at 70° C. while replacing the atmosphere inside the vessel with nitrogen. A monomer mixture composed of 60 g of methyl methacrylate, 10 g of butyl acrylate, 35 g of styrene and 0.4 g of t-butyl hydroperoxide as a monomer mixture that is not the shell forming monomers (A) was added thereto over the course of 120 minutes to carry out graft polymerization. Following completion of the addition of the monomer mixture, stirring was further continued for 2 hours to complete the reaction and obtain minute polymer particles (CS-2C) in the form of an aqueous latex. The polymerization conversion rate was 99%. As a result of measuring the particle size in the same manner as in Example 2 after diluting the minute polymer particles in the form of an aqueous latex with water, the measured particle size was 0.1 μm, and a sharp, monodisperse particle size distribution nearly similar to that of Example 2 was shown.

Calcium chloride was added to this aqueous latex of CS-2C. Then, the grafted rubber particles (CS-2C) were coagulated, dehydrated, and then dried for 1 day at 50° C. to obtain a powder of (CS-2C).

After adding 90 g of this powder of (CS-2C) to 910 g of a bisphenol A-based epoxy resin (Epikote 828EL, 187 g/eq), the mixture was mixed until large clumps of (CS-2C) were no longer present while heating to an upper limit of 120° C. with a homogenizer (Tokushu Kika Kogyo Co., Ltd.) to obtain a minute particle-containing epoxy resin composition (ECS-2C) containing 9% by weight of the powder of minute polymer particles (CS-2C). Furthermore, although 200 g of the powder of (CS-2C) was added to 800 g of the same bisphenol A-based epoxy resin (Epikote 828EL) and attempted to be mixed, the mixture had an extremely high viscosity so that it was unable to be mixed with a homogenizer.

An amount of 101.8 g of the minute polymer particle-containing polyepoxide (ECS-2C) was charged into a 500 mL separable flask and heated to 120° C. under stirring. After adding thereto a solution of methacrylic acid (39.4 g) with 0.107 g of hydroquinone monomethyl ether (MEHQ) and 0.006 g of 4-hydroxy-2,2,6,6-tetramethylpiperidine-1-oxyl (OH-TEMPO) dissolved therein and uniformly mixing the mixture, 0.39 g of N,N-dimethylbenzylamine was added to react for 3 hours at 110° C. to 115° C. in an air atmosphere. The acid value of the resulting minute polymer particle-containing epoxy methacrylate was 17. To the flask, 88.9 g of styrene monomer was then added and mixed to obtain 230 g of a minute polymer particle-containing vinyl ester resin composition (VEM-2C) (minute polymer particle content: 3.4% by weight, vinyl ester resin: 96.6% by weight, ratio of epoxy methacrylate/styrene monomer: 60/40 (charged weight ratio)).

An amount of 0.095 g of N,N-dimethylaniline and 1.9 g of a benzoyl peroxide paste (Luperox ACT50, Arkema, Inc., purity: 50% by weight) were added to 50 g of the vinyl ester resin obtained in this manner followed by curing using the same procedure as in Example 1. The dispersion of the minute polymer particles in the cured product was observed in the same manner as in Example 1. As a result, the particles (CS-2C) were found to be dispersed in the form of agglomerates, and nearly all the particles were dispersed at 1 μm to 2 μm. The fracture toughness value (K1c) of this cured product was 0.7 MPa*m$^{0.5}$.

The used materials and some measurement results in the above-mentioned Examples 1 to 7 and Comparative Examples 1 and 2 are summarized in Table 1.

TABLE 1

| | Shell forming monomers | Minute polymer particle | Minute polymer particle-containing epoxy resin composition | Minute polymer particle-containing vinyl ester resin composition | Fracture toughness value (MPa·m$^{0.5}$) |
|---|---|---|---|---|---|
| Example 1 | (A) | CS-1 | ECS-1 | VEM-1 | 1.2 |
| Example 2 | (A) | CS-2 | ECS-2 | VEM-2 | 1.2 |
| Example 3 | (A) | CS-3 | ECS-3 | VEM-3 | 1.2 |
| Example 4 | (A) | CS-4 | ECS-4 | VEM-4 | 1.2 |
| Example 5 | (A) | CS-5 | ECS-5 | VEM-5 | |
| Example 6 | (A) | CS-6 | ECS-6 | VEM-6 | |
| Example 7 | (A) | CS-7 | ECS-7 | VEM-7 | |
| Comparative Example 1 | not (A) | CS-1C | | VEM-1C | 0.9 |
| Comparative Example 2 | not (A) | CS-2C | ECS-2C | VEM-2C | 0.7 |

(Production of Minute Polymer Particle CS-101 Having Acrylic Rubber Core)

An amount of 800 g of water, 0.2 g of sodium dodecylbenzene sulfonate, 0.25 g of tripotassium phosphate, 5 mg of iron (II) sulfate hexahydrate, 20 mg of ethylenediaminetetraacetic acid (EDTA) and 0.8 g of sodium formaldehyde sulfoxylate were charged into a 3 L glass reaction vessel and heated to 40° C. in a nitrogen atmosphere. Then, a mixture of 415 g of butyl acrylate, 10.4 g of allyl methacrylate and 0.2 g of cumene hydroperoxide was added over the course of 300 minutes followed by continuous stirring for 120 minutes. During this time, sodium dodecylbenzene sulfonate was added in three portions (total of 8 g). An aqueous latex of a core polymer mainly derived from butyl acrylate was obtained in this manner.

Subsequently, 200 g of water was added to this aqueous core polymer latex followed by addition of a mixture consisting of a monomer mixture, composed of 21.3 g of 2-methoxyethyl acrylate, 42.5 g of ethyl acrylate, 21.2 g of n-butyl acrylate and 1.7 g of allyl methacrylate (shell forming monomers (B)), and 0.08 g of t-butyl hydroperoxide over the course of 120 minutes under continuous stirring in a nitrogen atmosphere to carry out graft polymerization. Following completion of the addition of the monomer mixture, stirring was further continued for 2 hours to complete the reaction and obtain minute polymer particles (CS-101) in the form of an aqueous latex. The polymerization conversion rate was 99%. A portion of this aqueous latex was coagulated with a 3% magnesium sulfate solution, rinsed with water and dried to obtain a solid polymer fraction. The resulting solid was formed into a sheet by hot-pressing at 160° C. Using this sheet, DMA analysis was carried out on the core-shell-type minute polymer particle CS-101, and as a result, the Tg of this polymer of the shell forming monomers, namely the shell polymer, was −33° C. (as measured by DMA). The results are summarized in Table 2. Measurement of the volume average particle size of the minute polymer particles was carried out with a particle size measuring device (Nikkiso Co., Ltd., Microtrac UPA) after diluting the minute polymer particles in the form of an aqueous latex with water. The measured value was 0.2 µm, and a sharp, monodisperse particle size distribution was shown.

TABLE 2

| | Minute polymer particle | Shell polymer Tg (° C.) | Minute polymer particle-containing polyepoxide | Minute polymer particle-containing vinyl ester resin composition | Fracture toughness value (K1c) (MPa·m$^{0.5}$) |
|---|---|---|---|---|---|
| Example 11 | CS-101 | (soft) −33 | ECS-101 | VEM-101 | 1.4 |
| Example 12 | CS-102 | (soft) −22 | ECS-102 | VEM-102 | 1.6 |
| Example 13 | CS-1 | (hard) 96 | ECS-1 | VEM-1 | 1.2 |
| Example 14 | CS-3 | (hard) 93 | ECS-3 | VEM-3 | 1.2 |
| Comparative Example 11 | | | | | 0.6 |

(Production of Minute Polymer Particle CS-102 Having Acrylic Rubber Core)

An amount of 800 g of water, 0.2 g of sodium dodecylbenzene sulfonate, 0.25 g of tripotassium phosphate, 5 mg of iron (II) sulfate hexahydrate, 20 mg of ethylenediaminetetraacetic acid (EDTA) and 0.8 g of sodium formaldehyde sulfoxylate were charged into a 3 L glass reaction vessel and heated to 40° C. in a nitrogen atmosphere. Then, a mixture of 415 g of butyl acrylate, 4.2 g of allyl methacrylate and 0.2 g of cumene hydroperoxide was added over the course of 300 minutes followed by continuous stirring for 120 minutes. During this time, sodium dodecylbenzene sulfonate was added in three portions (total of 8 g). An aqueous latex of a core polymer mainly derived from butyl acrylate was obtained in this manner.

Subsequently, 200 g of water was added to this aqueous core polymer latex followed by addition of a mixture consisting of a monomer mixture, composed of 21.2 g of 2-methoxyethyl acrylate, 42.5 g of ethyl acrylate, 13.8 g of n-butyl acrylate, 7.5 g of glycidyl methacrylate and 0.25 g of allyl methacrylate (shell forming monomers (B)), and 0.08 g of t-butyl hydroperoxide over the course of 120 minutes under continuous stirring in a nitrogen atmosphere to carry out graft polymerization. Following completion of the addition of the monomer mixture, stirring was further continued for 2 hours to complete the reaction and obtain minute polymer particles (CS-102) in the form of an aqueous latex. The polymerization conversion rate was 99%. DMA analysis was carried out on the core-shell-type minute polymer particle CS-102 using the same method as in the production example of CS-101 described above, and as a result, the Tg of this polymer of the shell forming monomers, namely the shell polymer, was −22° C. (as measured by DMA). The volume average particle size of the minute polymer particles in the form of an aqueous latex was 0.2 μm, and a sharp, monodisperse particle size distribution was shown.

<Production of Minute Polymer Particle-Containing Polyepoxide Composition>

The minute polymer particles CS-101 and CS-102 in the form of an aqueous latex were treated in accordance with the method described in WO 2005/28546 using methyl ethyl ketone, and mixed into a bisphenol A-based epoxy resin (Epikote 828EL, EEW=187, Japan Epoxy Resins Co., Ltd.) to respectively obtain minute polymer particle-containing polyepoxide compositions ECS-101 and ECS-102 each containing 25% by weight of the minute polymer particle in the bisphenol A-based epoxy resin.

The particle size of the minute polymer particles was measured with a particle size measuring device (Nikkiso Co., Ltd., Microtrac UPA) after diluting these compositions with methyl ethyl ketone, and the measured average particle sizes were as respectively indicated below. Both of the compositions showed a sharp, monodisperse particle size distribution similar to that of the minute polymer particles in the form of an aqueous latex, and no agglomerate was observed.

ECS-101: 0.2 μm
ECS-102: 0.2 μm

Example 11

An amount of 88 g of the minute polymer particle-containing polyepoxide (ECS-101) and 22.1 g of a bisphenol A-based epoxy resin (Epikote 828EL, 187 g/eq, Japan Epoxy Resins Co., Ltd.) were charged into a 500 mL separable flask and heated to 120° C. under stirring. After adding thereto a solution of 40.6 g of methacrylic acid with 0.061 g of hydroquinone monomethyl ether (MEHQ) and 0.006 g of monotertiary butyl hydroquinone dissolved therein, and uniformly mixing the mixture, 0.39 g of N,N-dimethylbenzylamine was added to react for 2.7 hours at 115° C. to 120° C. in a mixed nitrogen/oxygen gas atmosphere containing 6% by volume of oxygen. The acid value of the resulting minute polymer particle-containing epoxy methacrylate was 13 mgKOH/g.

Subsequently, 69.3 g of styrene monomer was then added to the separable flask and mixed to obtain 220 g of a minute polymer particle-containing vinyl ester resin composition (VEM-101) (minute polymer particle content: 10% by weight, vinyl ester resin: 90% by weight, ratio of epoxy methacrylate/styrene monomer: 65/35 (charged weight ratio), viscosity: 1.2 Pa·s (25° C.)).

An amount of 50 g of the minute polymer particle-containing vinyl ester resin (VEM-101) obtained in this manner was mixed with 46.2 g of a commercially available vinyl ester resin (Neopol 8250L, bisphenol A-based vinyl ester resin, Japan U-Pica Company Ltd.) and 3.8 g of styrene monomer followed by further adding 0.095 g of N,N-dimethylaniline and 0.1 g of a defoaming agent (BYK-A555, BYK-Chemie GmbH) thereto and uniformly mixing the mixture. Finally, 1.9 g of a benzoyl peroxide paste (Luperox ACT50, Arkema, Inc., purity: 50% by weight) was added followed by curing at room temperature. Generation of heat was observed about 30 minutes later and the mixture gelled. After being left to stand for 1 day at room temperature, the mixture was postcured for 4 hours at 60° C. The fracture toughness value (K1c) of this cured product was 1.4 MPa*m$^{0.5}$.

Example 12

An amount of 91.7 g of the minute polymer particle-containing polyepoxide (ECS-102) and 25.2 g of a bisphenol A-based epoxy resin (Epikote 828EL, 187 g/eq, Japan Epoxy Resins Co., Ltd.) were charged into a 500 mL separable flask and heated to 120° C. under stirring. After adding thereto a solution of 43.7 g of methacrylic acid with 0.064 g of hydroquinone monomethyl ether (MEHQ) and 0.006 g of monotertiary butyl hydroquinone dissolved therein, and uniformly mixing the mixture, 0.42 g of N,N-dimethylbenzylamine was added to react for 2.3 hours at 120° C. to 125° C. in a mixed nitrogen/oxygen gas atmosphere containing 6% by volume of oxygen. The acid value of the resulting minute polymer particle-containing epoxy methacrylate was 12 mgKOH/g.

Subsequently, 59.4 g of styrene monomer was then added to the separable flask and mixed to obtain 220 g of a minute polymer particle-containing vinyl ester resin composition (VEM-102) (minute polymer particle content: 10% by weight, vinyl ester resin: 90% by weight, ratio of epoxy methacrylate/styrene monomer: 70/30 (charged weight ratio), viscosity: 1.2 Pa·s (25° C.)).

An amount of 90 g of the minute polymer particle-containing vinyl ester resin (VEM-102) obtained in this manner was mixed with 76.5 g of a commercially available vinyl ester resin (Neopol 8250L, bisphenol A-based vinyl ester resin, Japan U-Pica Company Ltd.) and 13 g of styrene monomer followed by further adding 0.17 g of N,N-dimethylaniline and 0.18 g of a defoaming agent (BYK-A555, BYK-Chemie GmbH) thereto and uniformly mixing the mixture. Finally, 3.4 g of a benzoyl peroxide paste (Luperox ACT50, Arkema, Inc., purity: 50% by weight) was added followed by curing at room temperature. Generation of heat was observed about 30 minutes later and the mixture gelled. After being left to stand for 1 day at room temperature, the mixture was postcured for 4 hours at 60° C. The resulting cured product was observed with a transmission electron microscope (TEM) to analyze the dispersion of the minute polymer particles. As a result, the minute polymer particles were found to be uniformly dispersed as primary particles without agglomeration, and the dispersed particle size was 0.2 The fracture toughness value (K1c) of this cured product was 1.6 MPa*m$^{0.5}$. The glass transition temperature (Tg) of this cured product was 102° C. (as measured by DMA).

Example 13

An amount of 88 g of the minute polymer particle-containing polyepoxide (ECS-1) and 22.1 g of a bisphenol A-based epoxy resin (Epikote 828EL, 187 g/eq, Japan Epoxy Resins Co., Ltd.) were charged into a 500 mL separable flask and heated to 120° C. under stirring. After adding thereto a solution of 40.6 g of methacrylic acid with 0.061 g of hydroquinone monomethyl ether (MEHQ) and 0.006 g of monotertiary butyl hydroquinone dissolved therein, and uniformly mixing the mixture, 0.39 g of N,N-dimethylbenzylamine was added to react for 2.7 hours at 115° C. to 120° C. in a mixed nitrogen/oxygen gas atmosphere containing 6% by volume of oxygen. The acid value of the resulting minute polymer particle-containing epoxy methacrylate was 13 mgKOH/g.

Subsequently, 69.3 g of styrene monomer was then added to the separable flask and mixed to obtain 220 g of a minute polymer particle-containing vinyl ester resin composition (VEM-1) (minute polymer particle content: 10% by weight, vinyl ester resin: 90% by weight, ratio of epoxy methacrylate/styrene monomer: 65/35 (charged weight ratio), viscosity: 1.2 Pa·s (25° C.)).

An amount of 50 g of the minute polymer particle-containing vinyl ester resin (VEM-1) obtained in this manner was mixed with 46.2 g of a commercially available vinyl ester resin (Neopol 8250L, bisphenol A-based vinyl ester resin, Japan U-Pica Company Ltd.) and 3.8 g of styrene monomer followed by further adding 0.095 g of N,N-dimethylaniline and 0.1 g of a defoaming agent (BYK-A555, BYK-Chemie GmbH) thereto and uniformly mixing the mixture. Finally, 1.9 g of a benzoyl peroxide paste (Luperox ACT50, Arkema, Inc., purity: 50% by weight) was added followed by curing at room temperature. Generation of heat was observed about 30 minutes later and the mixture gelled. After being left to stand for 1 day at room temperature, the mixture was postcured for 4 hours at 60° C. The resulting cured product was observed with a transmission electron microscope (TEM) to analyze the dispersion of the minute polymer particles. As a result, the minute polymer particles were found to be uniformly dispersed as primary particles without agglomeration, and the dispersed particle size was 0.2 μm. The fracture toughness value (K1c) of this cured product was 1.2 MPa*m$^{0.5}$.

Example 14

A minute polymer particle-containing epoxy methacrylate having an acid value of 11 mgKOH/g was obtained in Example 14 using all the same procedures as in Example 13 except that ECS-3 was used as the minute polymer particle-containing polyepoxide instead of ECS-1 used in Example 13.

Subsequently, styrene monomer (same amount) was then added and mixed in the same manner as in Example 13 to obtain 220 g of a minute polymer particle-containing vinyl ester resin composition (VEM-3) (minute polymer particle content: 10% by weight, vinyl ester resin: 90% by weight, ratio of epoxy methacrylate/styrene monomer: 65/35 (charged weight ratio), viscosity: 0.7 Pa·s (25° C.)).

An amount of 50 g of the minute polymer particle-containing vinyl ester resin (VEM-3) thus obtained in Example 14 was mixed with Neopol 8250L and styrene monomer in the same manner as in Example 13 followed by adding N,N-dimethylaniline and a defoaming agent (BYK-A555) and uniformly mixing the mixture. Next, the mixture was cured using a benzoyl peroxide paste. The resulting cured product was observed with a transmission electron microscope (TEM) to analyze the dispersion of the minute polymer particles. As a result, the minute polymer particles were found to be uniformly dispersed as primary particles without agglomeration, and the dispersed particle size was 0.2 μm. The fracture toughness value (K1c) of this cured product was 1.2 MPa*m$^{0.5}$.

Example 15

An amount of 88 g of the minute polymer particle-containing polyepoxide (ECS-101), 21 g of a bisphenol A-based epoxy resin (Epikote 828EL, 187 g/eq, Japan Epoxy Resins Co., Ltd.) and 9.7 g of a bisphenol A-based epoxy resin (Epikote 1001, 470 g/eq, Japan Epoxy Resins Co., Ltd.) were charged into a 500 mL separable flask and heated to 120° C. under stirring. After adding thereto a solution of 41.9 g of methacrylic acid with 0.061 g of hydroquinone monomethyl ether (MEHQ) and 0.006 g of mono-tertiary butyl hydroquinone dissolved therein, and uniformly mixing the mixture, 0.41 g of N,N-dimethylbenzylamine was added to react for 3 hours at 120° C. to 125° C. in a mixed nitrogen/oxygen gas atmosphere containing 6% by volume of oxygen. The acid value of the resulting minute polymer particle-containing epoxy methacrylate was 14 mgKOH/g.

Subsequently, 59.4 g of styrene monomer was then added to the separable flask and mixed to obtain 220 g of a minute polymer particle-containing vinyl ester resin composition (VEM-103) (minute polymer particle content: 10% by weight, vinyl ester resin: 90% by weight, ratio of epoxy methacrylate/styrene monomer: 70/30 (charged weight ratio), viscosity: 6 Pa·s (25° C.)).

An amount of 90 g of the minute polymer particle-containing vinyl ester resin (VEM-103) obtained in this manner was mixed with 76.5 g of a commercially available vinyl ester resin (Neopol 8250L, bisphenol A-based vinyl ester resin, Japan U-Pica Company Ltd.) and 13 g of styrene monomer followed by further adding 0.17 g of N,N-dimethylaniline and 0.18 g of a defoaming agent (BYK-A555, BYK-Chemie GmbH) thereto and uniformly mixing the mixture. Finally, 3.4 g of a benzoyl peroxide paste (Luperox ACT50, Arkema, Inc., purity: 50% by weight) was added followed by curing at room temperature. Generation of heat was observed about 30 minutes later and the mixture gelled. After being left to stand for 1 day at room temperature, the mixture was postcured for 4 hours at 60° C. The fracture toughness value (K1c) of this cured product was 1.8 MPa*m$^{0.5}$.

Comparative Example 11

An amount of 0.1 g of N,N-dimethylaniline and 0.1 g of a defoaming agent (BYK-A555, BYK-Chemie GmbH) were added to 100 g of a commercially available bisphenol A-based vinyl ester resin (Neopol 8250L, bisphenol A-based vinyl ester resin, Japan U-Pica Company Ltd., ratio of epoxy methacrylate/styrene monomer: 60/40), and the mixture was uniformly mixed. Finally, 1.9 g of a benzoyl peroxide paste (Luperox ACT50, Arkema, Inc., purity: 50% by weight) was added followed by curing at room temperature. Generation of heat was observed about 30 minutes later and the mixture gelled. After being left to stand for 1 day at room temperature, the mixture was postcured for 4 hours at 60° C. The fracture toughness value (K1c) of this cured product was 0.6 MPa*m$^{0.5}$. The glass transition temperature (Tg) of this cured product was 95° C. (as measured by DMA under the same measurement conditions as in Example 2).

A comparison between Example 12 and Comparative Example 11 showed that contrary to the prior art, there was no decrease in Tg, or in other words, substantially no decrease in rigidity, while the toughness was significantly improved.

Comparative Example 12

An amount of 87 g of a bisphenol A-based epoxy resin (Epikote 828EL, 187 g/eq, Japan Epoxy Resins Co., Ltd.) and 9.7 g of a bisphenol A-based epoxy resin (Epikote 1001, 470 g/eq, Japan Epoxy Resins Co., Ltd.) were charged into a 500 mL separable flask and heated to 120° C. under stirring. After adding thereto a solution of 41.9 g of methacrylic acid with 0.061 g of hydroquinone monomethyl ether (MEHQ) and 0.006 g of mono-tertiary butyl hydroquinone dissolved therein, and uniformly mixing the mixture, 0.41 g of N,N-dimethylbenzylamine was added to react for 3 hours at 120° C. to 125° C. in a mixed nitrogen/oxygen gas atmosphere containing 6% by volume of oxygen. The acid value of the resulting minute polymer particle-containing epoxy methacrylate was 13 mgKOH/g.

Subsequently, 92.4 g of styrene monomer was then added to the separable flask and mixed to obtain 231 g of a minute polymer particle-containing vinyl ester resin composition (VEM-C103) (ratio of epoxy methacrylate/styrene monomer: 60/40 (charged weight ratio), viscosity: 2 Pa·s (25° C.)).

An amount of 90 g of the vinyl ester resin (VEM-C103) obtained in this manner was mixed with 90 g of a commercially available vinyl ester resin (Neopol 8250L, bisphenol A-based vinyl ester resin, Japan U-Pica Company Ltd.) followed by further adding 0.18 g of N,N-dimethylaniline and 0.18 g of a defoaming agent (BYK-A555, BYK-Chemie GmbH) thereto and uniformly mixing the mixture. Finally, 3.6 g of a benzoyl peroxide paste (Luperox ACT50, Arkema, Inc., purity: 50% by weight) was added followed by curing at room temperature. Generation of heat was observed about 30 minutes later and the mixture gelled. After being left to stand for 1 day at room temperature, the mixture was postcured for 4 hours at 60° C. The fracture toughness value (K1c) of this cured product was 0.6 MPa*m$^{0.5}$.

The invention claimed is:

1. A method for producing a minute polymer particle-containing vinyl ester resin composition,
the minute polymer particle-containing vinyl ester resin composition comprising a vinyl ester resin, 1 to 100 parts by weight of minute polymer particles based on 100 parts by weight of the vinyl ester resin, and 0 to 100 parts by weight of a vinyl monomer based on 100 parts by weight of the vinyl ester resin, wherein
the minute polymer particles comprise primary particles having a size of 0.05 μm to 1 μm, and
the minute polymer particles are dispersed in the minute polymer particle-containing vinyl ester resin composition, and
the method comprising in the following order:
obtaining a loose agglomerate of minute polymer particles;
obtaining a minute polymer particle dispersion;
obtaining a minute polymer particle-containing polyepoxide;
obtaining a minute polymer particle-containing vinyl ester resin by reacting an ethylenically unsaturated double bond-containing monocarboxylic acid with the minute polymer particle-containing polyepoxide; and
adding the vinyl monomer to the vinyl ester resin.

2. A minute polymer particle-containing vinyl ester resin composition, comprising a vinyl ester resin, 1 to 100 parts by weight of minute polymer particles based on 100 parts by weight of the vinyl ester resin, and 0 to 100 parts by weight of a vinyl monomer based on 100 parts by weight of the vinyl ester resin, wherein
the minute polymer particles comprise primary particles having a size of 0.05 μm to 1 μm,
the minute polymer particles are dispersed in the minute polymer particle-containing vinyl ester resin composition,
the minute polymer particles have a core-shell structure, a shell polymer thereof having a glass transition temperature (Tg) of below 20° C., and
the shell polymer comprises a copolymer of shell forming monomers (B) comprising
5% to 95% by weight of an alkoxyalkyl (meth)acrylate,
0% to 40% by weight of glycidyl (meth)acrylate,
0% to 20% by weight of a polyfunctional vinyl monomer, and
5% to 70% by weight of other vinyl monomers,
each based on 100% by weight of the shell forming monomers (B).

3. The minute polymer particle-containing vinyl ester resin composition according to claim 2, wherein
the vinyl ester resin is a reaction product of an ethylenically unsaturated double bond-containing monocarboxylic acid and a minute polymer particle-containing polyepoxide which contains 100 parts by weight of a polyepoxide and 1 to 100 parts by weight of the minute polymer particles and in which the minute polymer particles comprise primary particles and are dispersed in the polyepoxide.

4. The minute polymer particle-containing vinyl ester resin composition according to claim 2, wherein
a (meth)acrylate group is grafted to the minute polymer particles.

5. The minute polymer particle-containing vinyl ester resin composition according to claim 3, wherein
the reaction product is a reaction product of an ethylenically unsaturated double bond-containing monocarboxylic acid and the minute polymer particle-containing polyepoxide in which the epoxy equivalent weight has been increased by 25 g/eq or more from less than 500 g/eq in the presence of the dispersed minute polymer particles.

6. A cured product, obtained by curing by radical polymerization a curable composition comprising the minute polymer particle-containing vinyl ester resin composition according to claim 2, wherein
the minute polymer particles are dispersed in the cured product.

* * * * *